United States Patent
Edwards et al.

(10) Patent No.: US 7,620,938 B2
(45) Date of Patent: Nov. 17, 2009

(54) COMPRESSED PROGRAM RECORDING

(75) Inventors: Andrew James Edwards, Bellevue, WA (US); Darek Mihocka, Bellevue, WA (US); Ho-Yuen Chau, Redmond, WA (US); Ronald C. Murray, Sammamish, WA (US); Sanjay Bhansali, Sammamish, WA (US); Stuart D. de Jong, Sammamish, WA (US); Wen-Ke Chen, Redmond, WA (US); Kenneth Bryant Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/264,487

(22) Filed: Oct. 31, 2005

(65) Prior Publication Data

US 2007/0168989 A1    Jul. 19, 2007

(51) Int. Cl.
    *G06F 9/45*    (2006.01)
(52) U.S. Cl. ..................................... 717/124
(58) Field of Classification Search .................. 717/127
    See application file for complete search history.

(56) References Cited

U.S. PATENT DOCUMENTS

| | | | |
|---|---|---|---|
| 5,553,205 A | 9/1996 | Murray | |
| 5,640,607 A | 6/1997 | Murray | |
| 5,768,435 A | 6/1998 | Murray | |
| 6,460,178 B1 | 10/2002 | Chan et al. | |
| 6,481,008 B1 | 11/2002 | Chaiken et al. | |
| 6,662,356 B1 | 12/2003 | Edwards et al. | |
| 6,802,056 B1 | 10/2004 | Chaiken et al. | |
| 6,954,747 B1 | 10/2005 | Wang et al. | |
| 2002/0169999 A1 | 11/2002 | Bhansali et al. | |
| 2003/0217196 A1 | 11/2003 | Chan et al. | |
| 2003/0217197 A1 | 11/2003 | Chan et al. | |
| 2004/0083460 A1 | 4/2004 | Pierce | |
| 2004/0123185 A1 | 6/2004 | Pierce et al. | |
| 2004/0210885 A1 | 10/2004 | Wang et al. | |
| 2004/0230957 A1 | 11/2004 | Wang et al. | |
| 2004/0264367 A1 | 12/2004 | Edwards et al. | |
| 2004/0268309 A1 | 12/2004 | Grover et al. | |
| 2005/0010891 A1 | 1/2005 | Chaiken et al. | |
| 2006/0218540 A1 | 9/2006 | Edwards et al. | |

OTHER PUBLICATIONS

U.S. Appl. No. 11/080,678, filed Mar. 25, 2005, Edwards et al.
U.S. Appl. No. 10/968,577, filed Oct. 18, 2004, Bhansali et al.

(Continued)

*Primary Examiner*—John Chavis
(74) *Attorney, Agent, or Firm*—Woodcock Washburn LLP

(57) ABSTRACT

Program execution can be monitored and recorded for later playback. Certain state changes that can be predicted via a virtual processor during playback need not be recorded, so a compressed recording can be stored. To facilitate random access with respect to time during playback, key frames can be stored within the compressed recording. An index mechanism can associate key frames with particular memory addresses. Additionally, a snapshot of values for memory addresses can be used to further facilitate determining the value of a memory address without having to simulate execution. Multiprocessor executions can be supported, and playback can be done on a machine type different from that on which recording took place.

12 Claims, 33 Drawing Sheets

OTHER PUBLICATIONS

"Analysis Traces," http://www.base.com/gordoni/sky/user/analysis.html, 3 pages, website visited on Sep. 26, 2005.

"The DynamoRIO Collaboration," http://www.cag.lcs.mit.edu/dynamorio/, 2 pages, website visited on Sep. 27, 2005.

Abdelwahab et al., "Compression Techniques to Simplify the Analysis of Large Execution Traces," University of Ottawa, Canada, 22 pages, 2002.

Agarwal et al., "Blocking: Exploiting Spatial Locality for Trace Compaction," *ACM SIGMETRICS Performance Evaluation Review*, vol. 18, Issue 1, pp. 48-57, 1990.

Amarasignhe, "On the Run—Building Dynamic Program Modifiers for Optimization, Introspection and Security," Laboratory for Computer Science, Massachusetts Institute of Technology, http://www.cs.wisc.edu/asplos-X/on_the_run.htm, 2 pages, website visited on Sep. 29, 2005.

Ayers et al., "TraceBack: First Fault Diagnosis by Reconstruction of Distributed Control Flow," *ACM SIGPLAN Notices*, vol. 40, Issue 6, pp. 201-212, Jun. 2005.

Becker et al., "An Analysis of the Information Content of Address Reference Streams," *Proceedings of the 24th annual international symposium on Microarchitecture*, pp. 19-24, Sep. 16, 1991.

Brown, "Step: A Framework for the Efficient Encoding of General Trace Data," Thesis, School of Computer Science, McGill University, Montréal, 138 pages, Dec. 2002.

Chilimbi et al., "Designing a Trace Format for Heap Allocation Events," *Proceedings of the 2nd international symposium on Memory management*, pp. 35-49, 2001.

King et al., "Debugging Operating Systems with Time-Traveling Virtual Machines," *2005 USENIX Annual Technical Conference*, USENIX Association, pp. 1-15, Apr. 2005.

Lin et al., "Performance Comparison of Path Matching Algorithms over Compressed Control Flow Traces," *Data Comparison Conference*, pp. 113-122, Sep. 2005.

Luk et al., "Pin: Building Customized Program Analysis Tools with Dynamic Instrumentation," *Proceedings of the 2005 ACM SIGPLAN conference on Programming language design and implementation*, 11 pages, Jun. 2005.

Luo et al., "Locality-Based Online Trace Compression," *IEEE Transactions on Computers*, pp. 723-731, Jun. 2004.

Narayanasamy et al., "BugNet: Continuously Recording Program Execution for Deterministic Replay Debugging," 12 pages, *Proceedings of the 32nd International Symposium on Computer Architecture, IEEE*, Jun. 2005.

Reiss, "Encoding Program Executions," IEEE, *Proceedings of the 23rd International Conference on Software Engineering*, pp. 221-203, 2001.

Scheiber, "RATCHET: Real-Time Address Trace Compression Hardware for Extended Traces," *Performance Evaluation Review*, vol. 21, No. 3&4, Apr. 1994.

Srinivasan et al., "Flashback: A Lightweight Extension for Rollback and Deterministic Replay for Software Debugging," *Proceedings of the General Track, 2004 USENIX Annual Technical Conference*, 16 pages, Jun. 27-Jul. 2, 2004.

Francel et al., "Fault Localization Using Execution Traces," Proceedings of the 30th annual Southeast regional conference (ACM), 1992, 8 pages.

FIG. 16

```
COMPRESSED PROGRAM RECORDING

PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
         PLAYBACK DATA
              . . .
         PLAYBACK DATA
         PLAYBACK DATA
         PLAYBACK DATA
         PLAYBACK DATA  ←  1690
         PLAYBACK DATA
         PLAYBACK DATA
         PLAYBACK DATA

|  | SUMMARIZATION INDEX |
|---|---|
| ADDRESS | KEY FRAME(S) |
| 0102 | 0002, 0005 |
| 0104 | 0002 |
| AE01 | 0010 |
| AE02 | 0002, 0003, 0004, 0005, 0010 |

COMPRESSED PROGRAM RECORDING

BACKGROUND

Debugging computer software can be a particularly challenging endeavor. Software defects ("bugs") are notoriously difficult to locate and analyze. One common way to locate bugs is to generate a trace of program execution. In such an approach, processor state and the values of memory locations are recorded after each single step of a program. A programmer can then consult the trace of the program's execution to see if the program is executing as expected.

However, such a conventional approach breaks down if the program is particularly complex or if the program runs for any significant length of time. The pure volume of data generated by such a trace can quickly overwhelm the bandwidth and storage capacity of even advanced computer systems.

SUMMARY

During execution, a software program can be monitored to generate a recording of the program's execution. Compression techniques can be used to reduce the size of the recording of the program's execution. For example, if a value for a memory address can be predicted via a virtual processor during playback, the value need not be stored in the recording.

Various other features can be incorporated if desired. For example, key frames can enable playback from an intermediate position (e.g., in random access fashion) within the recording. A summarization index can facilitate efficient location of relevant key frames, and memory snapshots can be used to determine a value for a memory address without playing back the part of the recording that accesses the memory address. Multi processor support can include use of sequence numbers for synchronization.

The foregoing and other features and advantages will become more apparent from the following detailed description of disclosed embodiments, which proceeds with reference to the accompanying drawings.

BRIEF DESCRIPTION OF THE FIGURES

FIG. 16 is a drawing showing a request for a value of a memory location deep within playback data.

FIG. 22 is a drawing of an exemplary summarization index associating key frames with memory addresses.

DETAILED DESCRIPTION

EXAMPLE 1

Exemplary System Employing a Combination of the Technologies

Figure 1:
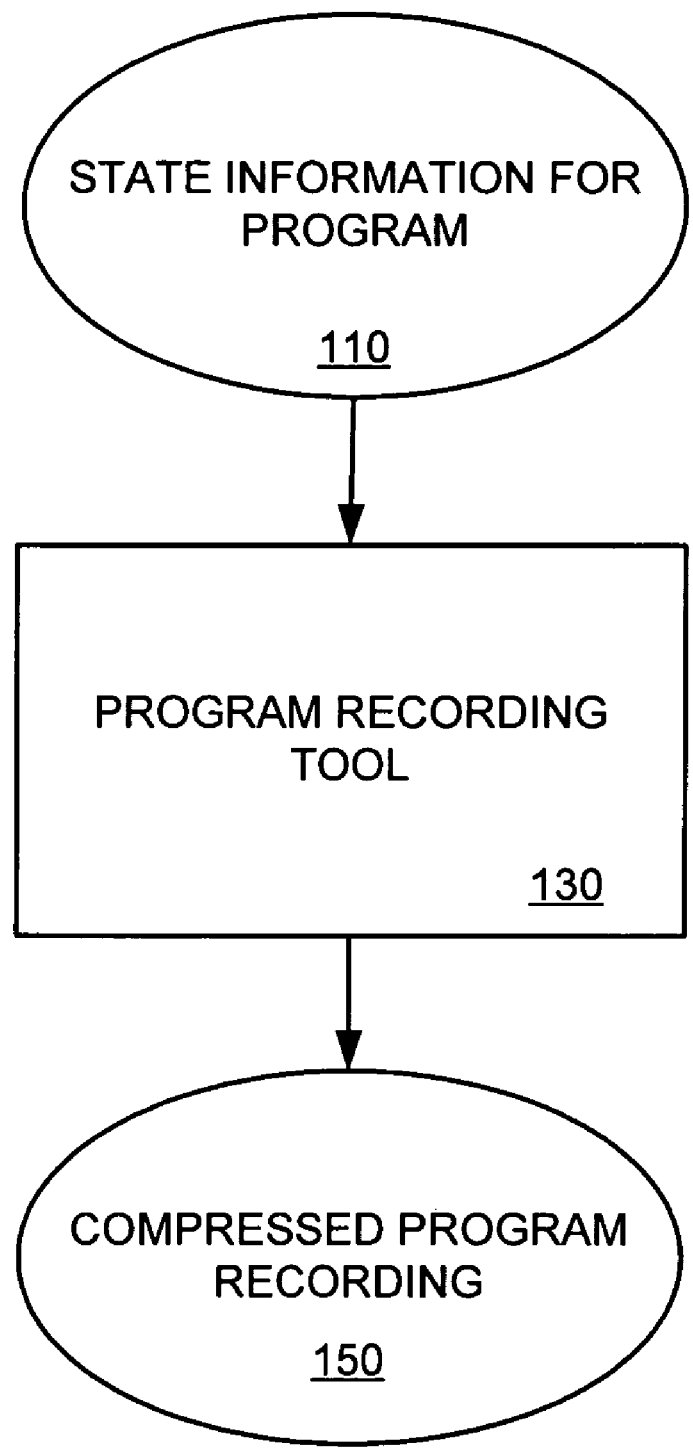
FIG. 1 is a block diagram of an exemplary system employing a combination of the technologies described herein.

FIG. 1 is a block diagram of an exemplary system 100 employing a combination of the technologies described herein. Such a system 100 can be provided separately or as part of a software development environment.

In the example, a program recording tool 130 processes state information 110 within a software program under test during monitored execution of the program. Such execution can be simulated execution of the program (e.g., by a software simulation engine that accepts an executable version of the program). The program recording tool 130 can generate a recording 150 of the execution of the program, which as explained in the examples herein can be compressed. As explained herein, the recording 150 can include instructions (e.g., code) for the software program under test as well as a series of values that can be consulted to determine values for memory address read operations during playback.

Execution monitoring can monitor state information including read and write operations. For example, the address and size of reads or writes can be monitored.

In practice, the program recording can then be played back to determine the state of the program at various points in time during the monitored execution.

EXAMPLE 2

Exemplary State Information

In any of the examples herein, state information can include state changes or other information about the processor state, changes to or values of memory addresses, or any other changes in the state of the machine (e.g., virtual machine) caused during execution of the program (e.g., by the program itself or services invoked by the program).

For example, a register within a processor can change and values for memory locations can change, information about the value of registers or memory locations can be monitored, or both.

EXAMPLE 3

Exemplary Method Employing a Combination of the Technologies

Figure 2:
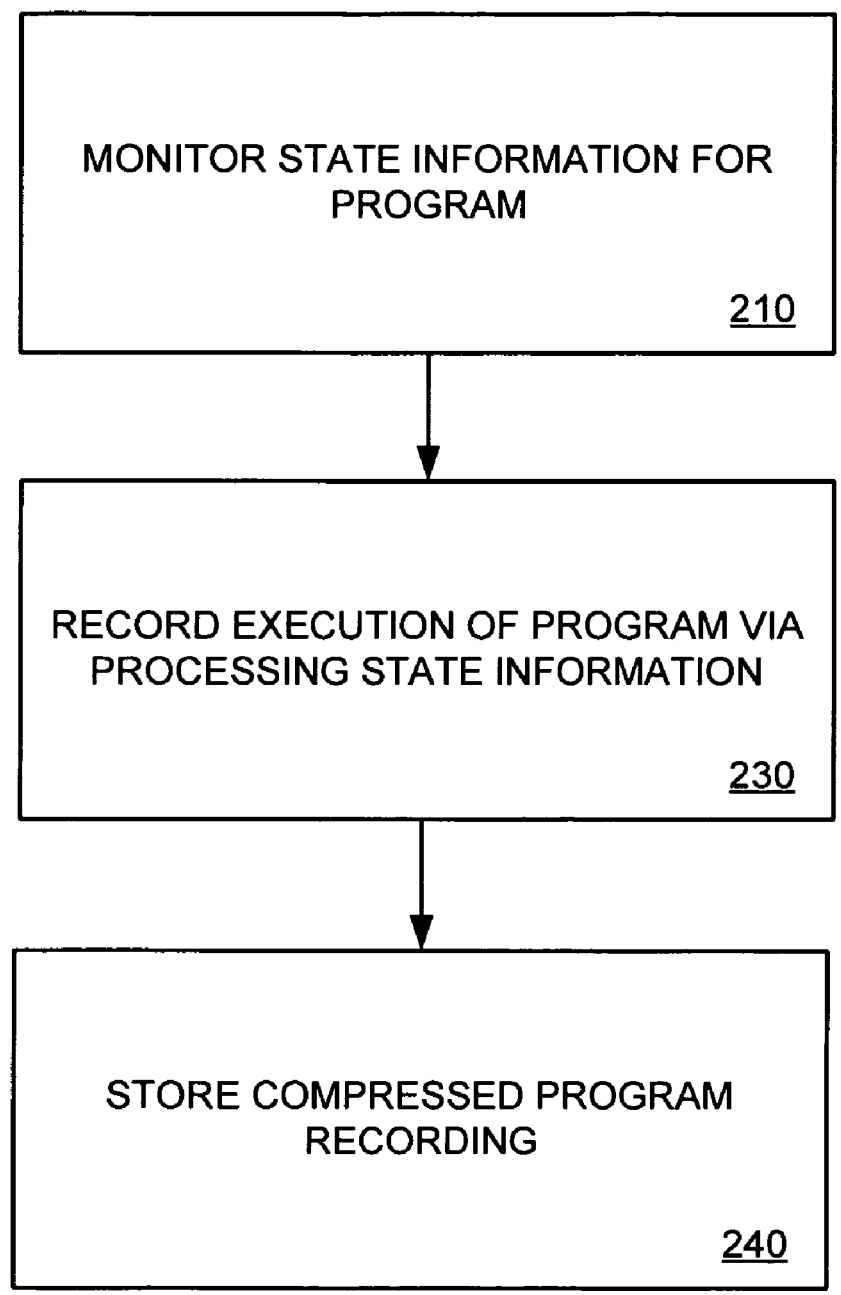
FIG. 2 is a flowchart of an exemplary method employing a combination of the technologies described herein and can be implemented in a system such as that shown in FIG. 1.

FIG. 2 is a flowchart of an exemplary method 200 employing a combination of the technologies described herein and can be implemented in a system such as that shown in FIG. 1. In the example, at 210 state information for the program under test is monitored (e.g., by the program recording tool 110 of FIG. 1). At 230, the state information is processed to record execution of the program. As described herein, various techniques can be used to reduce the amount of data to be stored when recording execution, resulting in compression.

At 240, a compressed version of the program's recorded execution is stored.

EXAMPLE 4

Exemplary Program Recordings

A recording of a program's execution (or a "program recording") can include information about state during recorded monitored execution of the program. In practice, the recording can also include executable instructions of the program, which can be used during playback to simulate execution. In some cases, playback of such instructions can be used to determine state changes without having to explicitly store the state (e.g., without having to store a changed value of a register or memory address when the value changes).

For example, if an instruction merely makes a change internal to the processor, the change can be determined by simulating execution of the instruction, without having to store the resulting value. In practice, such instructions include those that increment registers, add constants, and the like. Compression can be achieved by not including state information in the program recording for such instructions.

EXAMPLE 5

Figure 3:
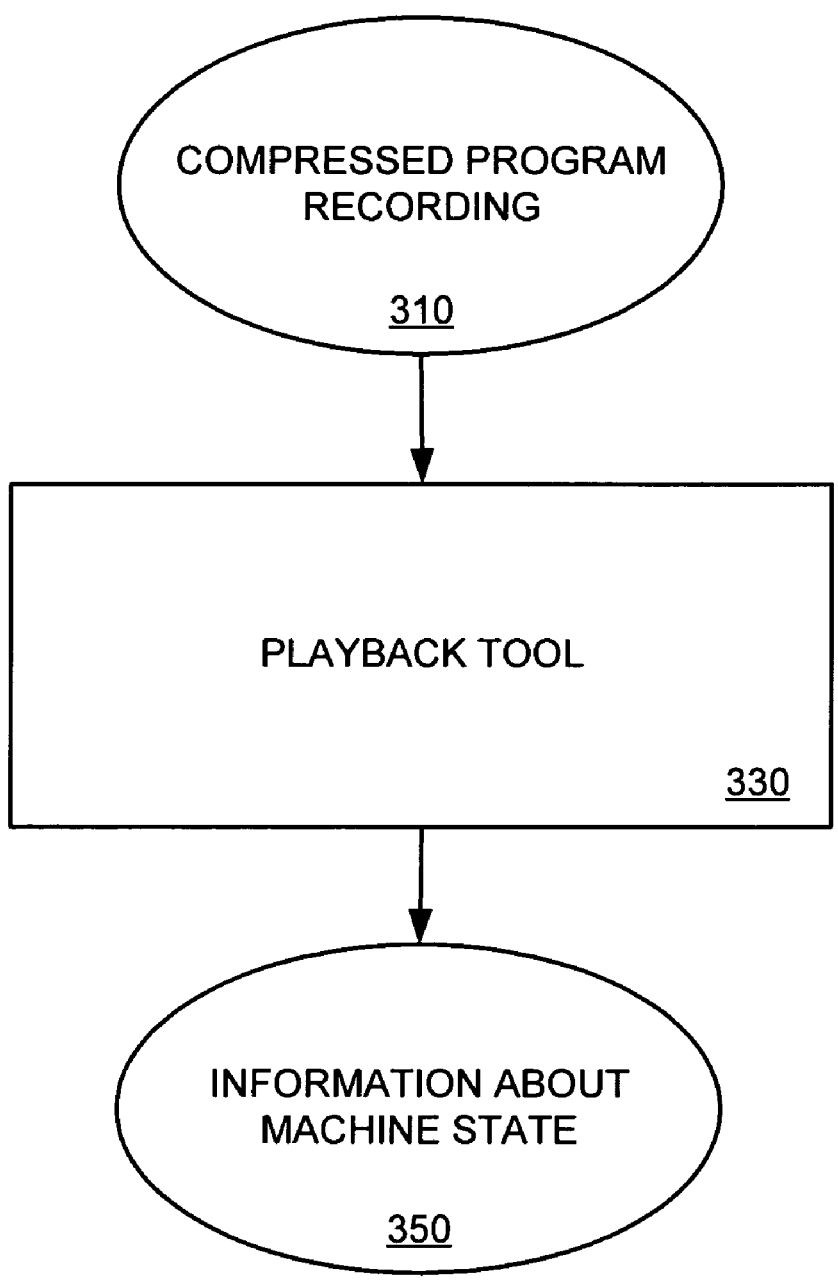
FIG. 3 is a block diagram of a system generating information about machine state via a compressed program recording.

Exemplary System Generating Information about Machine State Via Compressed Program Recording FIG. 3 is a block diagram of a system 300 generating information 350 about machine state via a compressed recording 310 of a program's execution. In the example, a playback tool 330 accepts the compressed recording 310 (e.g., such as the compressed recording 150 of FIG. 1) and generates information 350 about the machine state.

The information 350 can include the value of a memory address at a particular point in time during the recorded execution of the program (e.g., what is the value of memory location x after execution of the nth instruction—or after n processor cycles).

In practice, the playback tool 330 can be used as a debugger tool that a software developer can employ to determine the values of memory addresses and registers during execution of the program.

As described herein, certain information about machine state can be predicted via the playback tool 330; therefore, the number of values stored in the recording 310 can be significantly reduced. Because the compressed program recording 310 can be of a smaller size than an uncompressed trace of the program's execution, the system 300 can be used to analyze and debug complex programs or programs that run for extended periods of time that could not be efficiently analyzed via an uncompressed trace.

EXAMPLE 6

Figure 4:
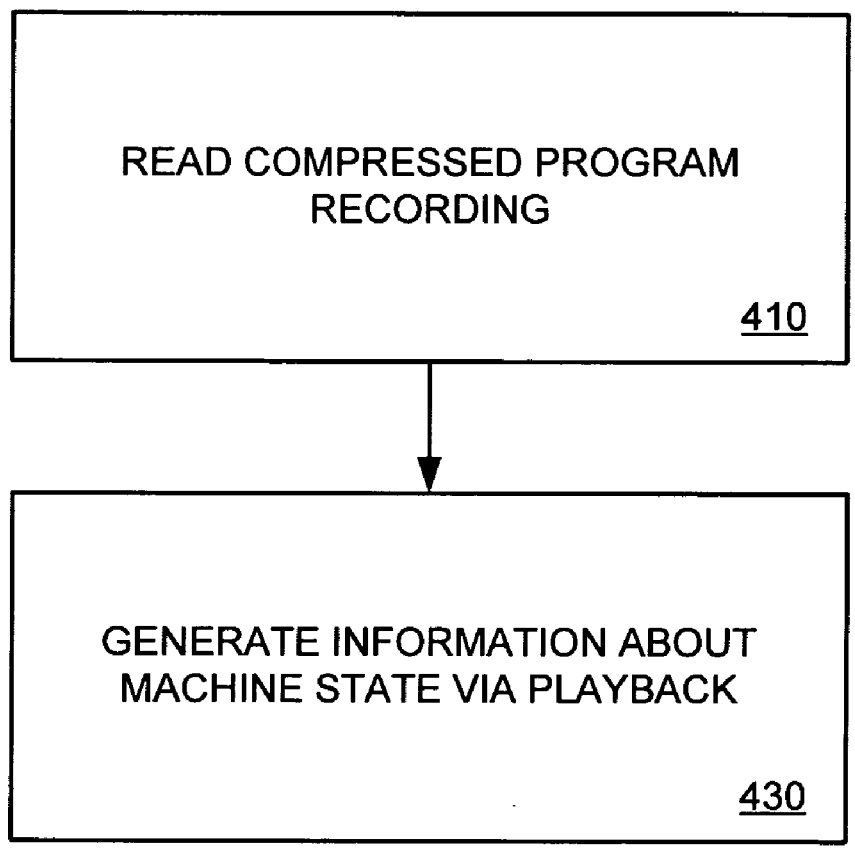
FIG. 4 is a flowchart of an exemplary method generating information about machine state via playback.

Exemplary Method of Generating Information about Machine State via Playback FIG. 4 is a flowchart of an exemplary method 400 of generating information about machine state via playback of a compressed recording (e.g., such as the compressed recording 310 of FIG. 3). At 410, the compressed recording is read. At 430, information about the machine's state is generated via the playback. For example, the value of registers and memory addresses can be determined for various points of time during execution of the program, according to the state information monitored during recording.

EXAMPLE 7

Exemplary Compression Techniques

Figure 5:
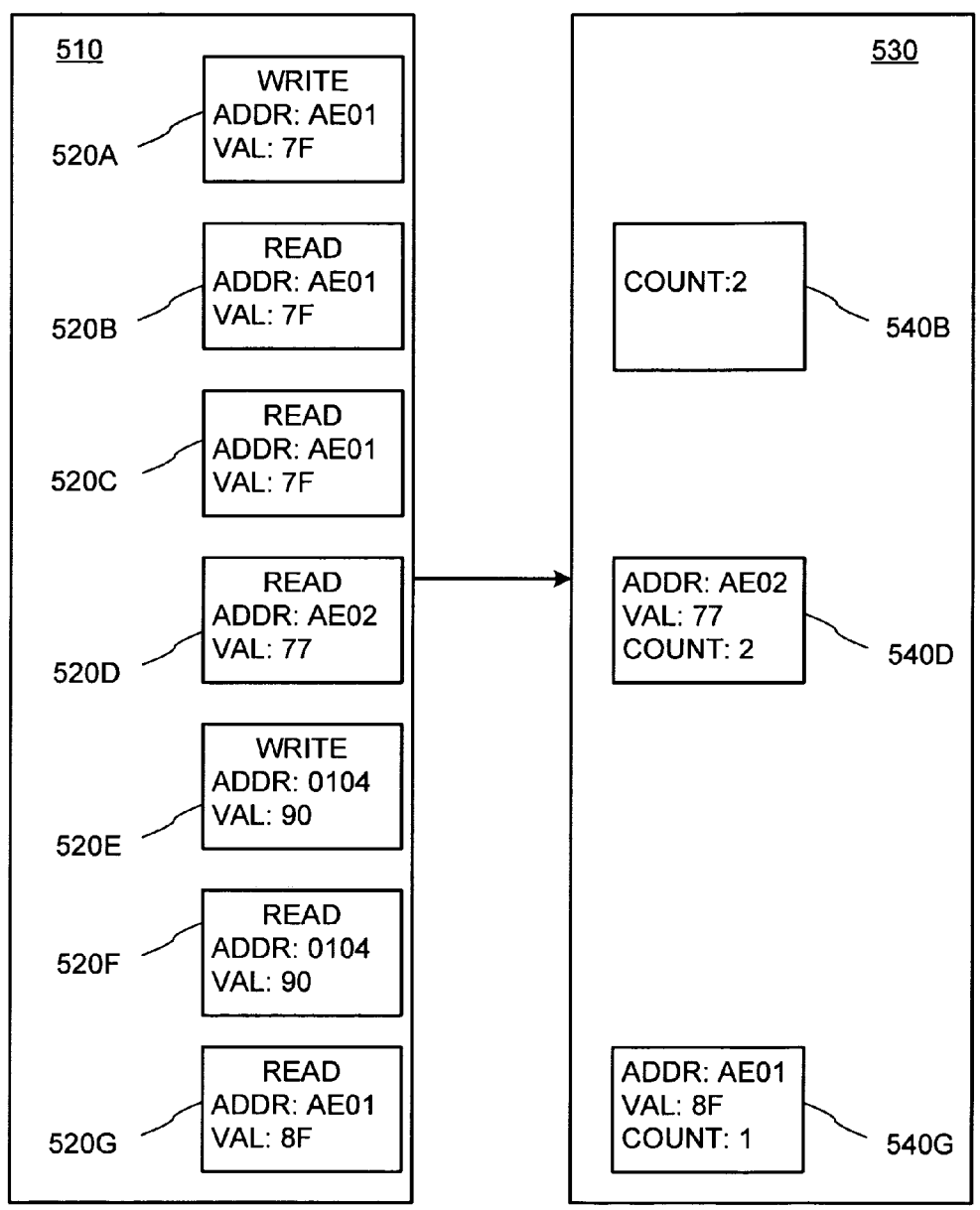
FIG. 5 is a block diagram showing an exemplary compression technique for use in program recordings.

In any of the examples described herein, a variety of compression techniques can be used to reduce the size of a program recording. FIG. 5 shows an example 500 of a compression technique for use in program recordings.

In the example, activity by a processor executing a program under test is shown in the uncompressed series 510 of operations 520A-520G. The resulting compressed series 530 of recorded states 540B, 540D, 540F, and 540G are sufficient to reconstruct the uncompressed series 510. To conserve space, a count can be stored instead of storing the values for certain memory addresses.

The techniques shown include discarding values for writes, such as the write 520A. Such a write can be discarded from the compressed series 530 because the value can be regenerated via the virtual processor and executable instructions of the program under test. So, for example, the value for the write 520A is not included in the series 530 because it can be predicted during playback when the write operation is executed (e.g., by a virtual processor). Instead, a count is stored in 540B to indicate that the next two reads 520B and 520C can be correctly predicted based on the value from the write 520A.

Due to the count stored in 540B, the series 530 also does not need to store values for successive reads, if the reads result in the same value. So, for example, the read for operation 520C need not be recorded because the read before it, 520B had the same value. In particular, successive identical reads or reads after writes (e.g., when the value has not changed due to an external operation) can be predicted via any of the predictability techniques described herein. The compressed data in 530 can also indicate the size of read or write operations. However, in practice, the size need not be stored because it can be re-created during playback.

The series 530 can be stored as a stream. If desired, different streams can be used for the different components of the data (e.g., a separate stream for values and counts, and the like). The information stored in the compressed program recording can also include data about instructions that break virtualization (e.g., instructions that query the time or machine configuration) for consideration during playback.

In practice, the series 530 can be stored with executable instructions for the program being recorded as a compressed program recording, from which playback can determine the values of the memory addresses without having to store all the values involved in the read and write operations.

EXAMPLE 8

Exemplary Compression via Predictability

The technique of not storing values can also be described as not storing values if they can be predicted. Such predictions can rely on a virtual processor executing instructions of the software program under test and values already loaded (e.g., at playback time) from the compressed program recording.

When executing instructions of the software program under test, it might be expected that the value (e.g., for a memory address) will be a certain value. For example, it is expected that a value read from a memory address will be the value that was last written to it.

In some cases, such an expectation will be wrong. For example, the program may have switched into an unmonitored mode (e.g., kernel mode), which changed the value of the memory address. Further, if other threads or processors are running, they may change the value of the memory address. In such a case, the subsequently monitored value will not have been correctly anticipated, and it can be included in the program recording (e.g., the compressed series 530). And further, the value could change yet again, so that the read from the value will be yet a different value.

So, predictability can take advantage of the observation that a value is expected to be what was last written to the memory address, but can also consider which values have already been loaded from the compressed program recording. A value that can be correctly predicted from a write or an entry in the compressed series 530 that has already been loaded (e.g., at playback time) need not be stored again in the program recording. Instead, for example, a running count of the number of times in a row that values will be correctly predicted by the virtual processor and the entries already loaded (e.g., at playback time) from the series can be stored. For cases in which the prediction is correct, a value need not be stored in the program recording (e.g., the compressed series 530). When the prediction is not correct, the value can be stored so that it can be loaded during playback.

Because the same virtual machine (e.g., or an emulator of it) consulting the stored program recording will predict the same values during playback, storing the predictable values is unnecessary. Avoiding storage of the values can significantly reduce the size of the program recording.

Figure 6:
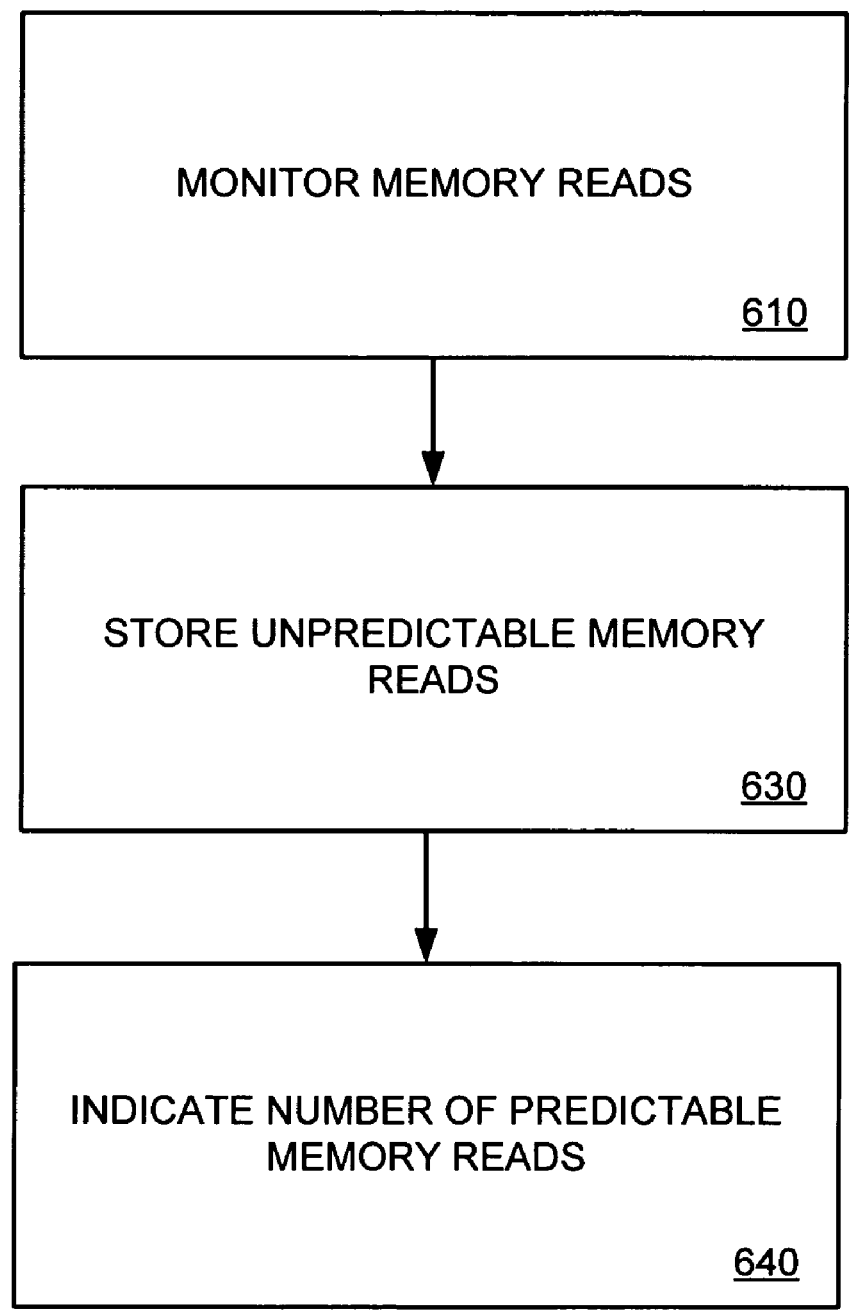
FIG. 6 is a flowchart of an exemplary method for compressing a program recording via predictability.

FIG. 6 shows an exemplary method 600 for compressing a program recording via predictability. At 600, execution of the program is monitored. For example, reads of memory addresses are monitored. At 630, unpredictable values for reads of memory addresses are stored as part of the program recording. However, values for memory addresses that are predictable need not be stored. Instead, some other indication can be used. For example, at 640, a running count of the number of times in a row that values will be correctly predicted during playback can be stored (e.g., as a count). In some cases, such a count indicates the number of successive predictable memory reads. As described herein, values for writes to memory can be discarded (e.g., an indication of the value written need not be included in the program recording for the write operation) because the value for the write operation can be determined during playback via the executable instructions and the virtual processor.

EXAMPLE 9

Exemplary System for Determining Memory State

Figure 7:
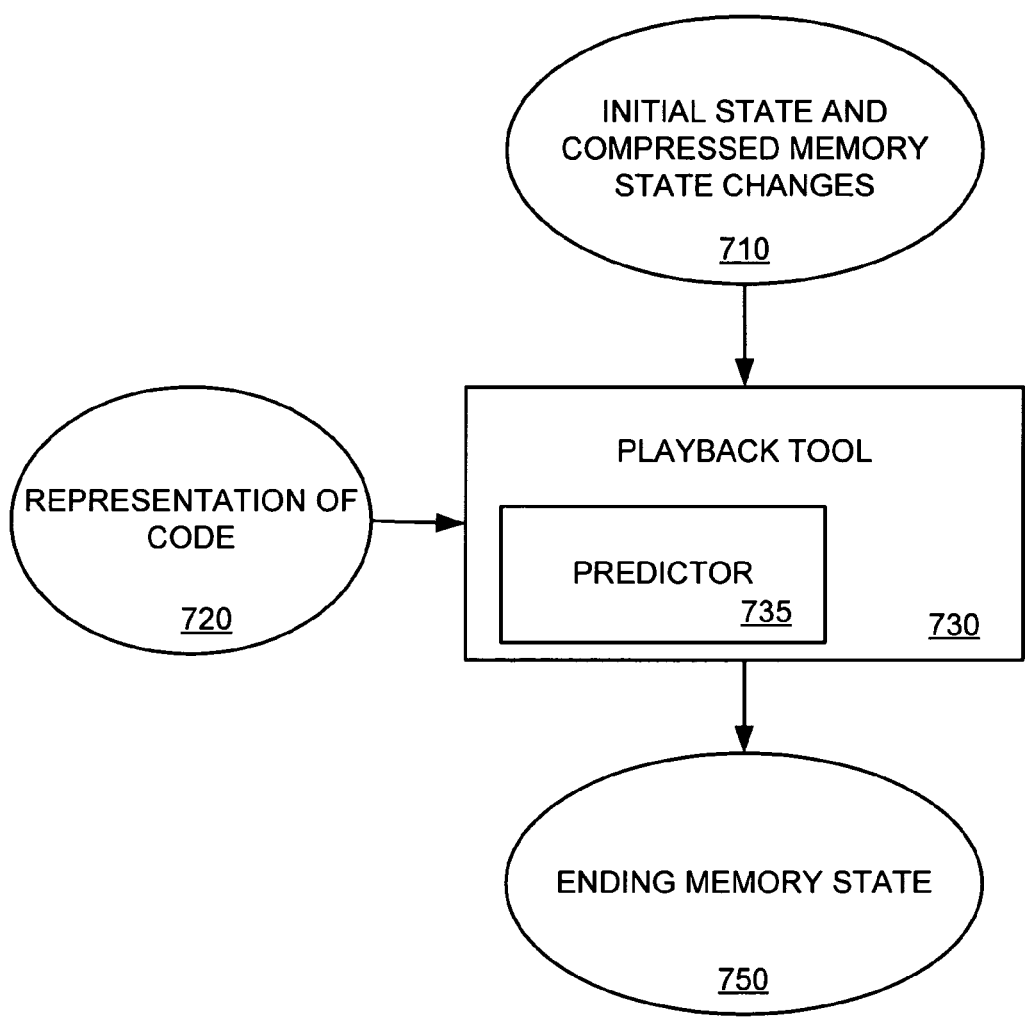
FIG. 7 is a block diagram of an exemplary system for determining memory state via compressed recorded memory state information and a representation of executable instructions.

FIG. 7 is a block diagram of an exemplary system 700 for determining memory state 750 via recorded compressed memory state changes 710 and a representation 720 of executable instructions for a program.

In the example, a playback tool 730 accepts an initial state and recorded memory state changes 710 for execution of a program along with a representation 720 of the executable instructions for the program. Using a predictor 735 (e.g., which can include a virtual processor that can execute the instructions 720), the playback tool 730 can determine an ending memory state 750 at a particular point during the execution, which will reflect the memory state of the program when execution was monitored and recorded.

EXAMPLE 10

Figure 8:
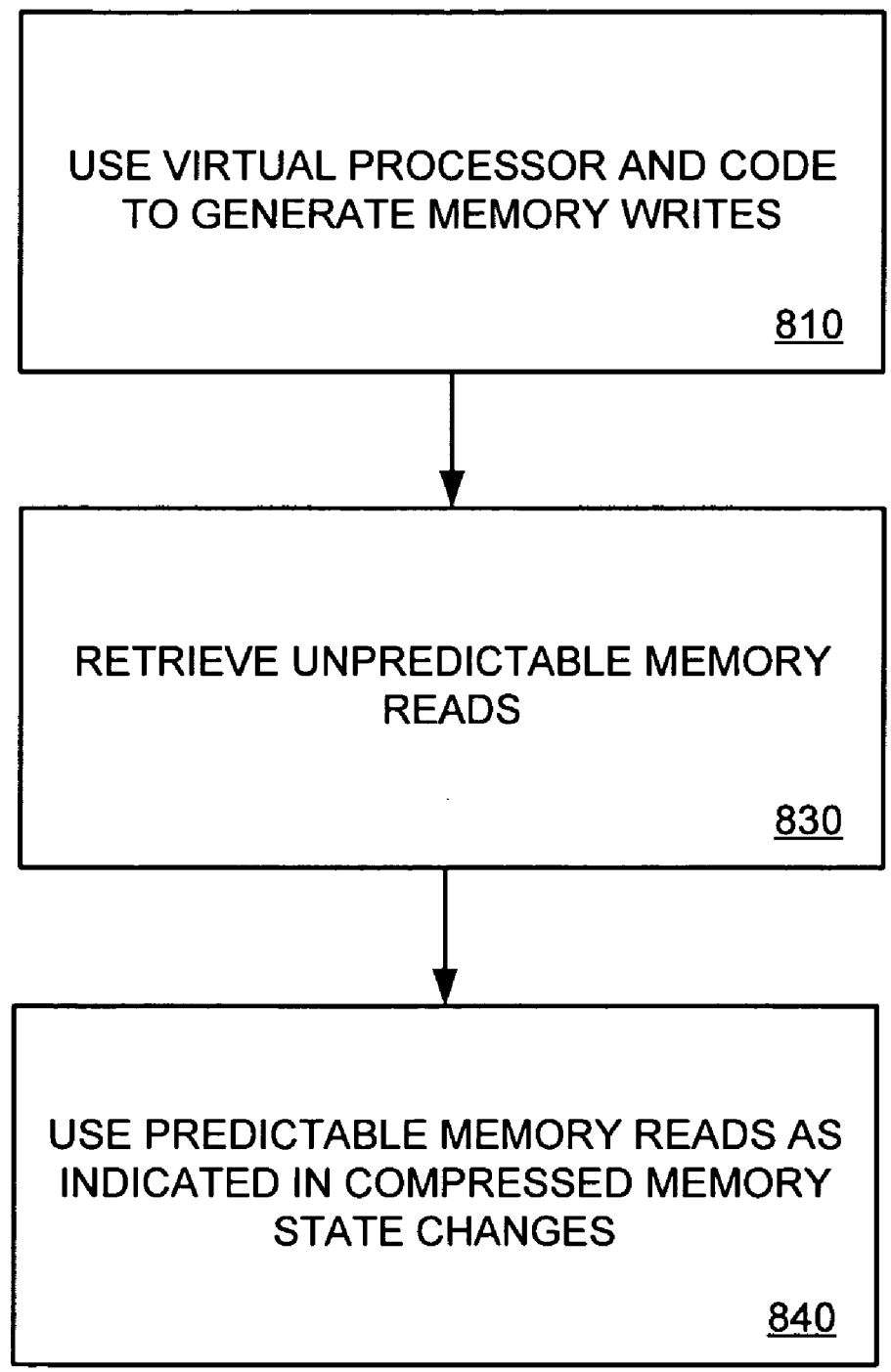
FIG. 8 is a flowchart showing an exemplary method of using a predictor and compressed recorded memory state information to determine memory state.

Exemplary Method of Using a Predictor and Compressed Memory State Changes to Determine Memory State In any of the examples herein, compressed memory state changed can be included in a program recording. FIG. 8 shows an exemplary method 800 of using a predictor and compressed memory state changes to determine memory state.

At 810, a virtual processor can be used in conjunction with a representation of executable instructions to generate appropriate values for memory write operations. As a result, values for the memory write operations by the processor need not be stored in the program recording. When determining the value of memory addresses, values for unpredictable memory reads are retrieved from the program recording at 830.

Predictable memory reads can be predicted via a predictor, and the compressed memory state changes can indicate whether the memory read is predictable or not (e.g., by keeping a count of successive predictable reads). At 840, the predictable memory reads as indicated in the compressed memory state changes are used to determine the value of memory addresses.

Because the values involved in memory writes and reads can be determined, the value for a particular address in memory can be determined at a specified point in time for the program.

EXAMPLE 11

Figure 9:
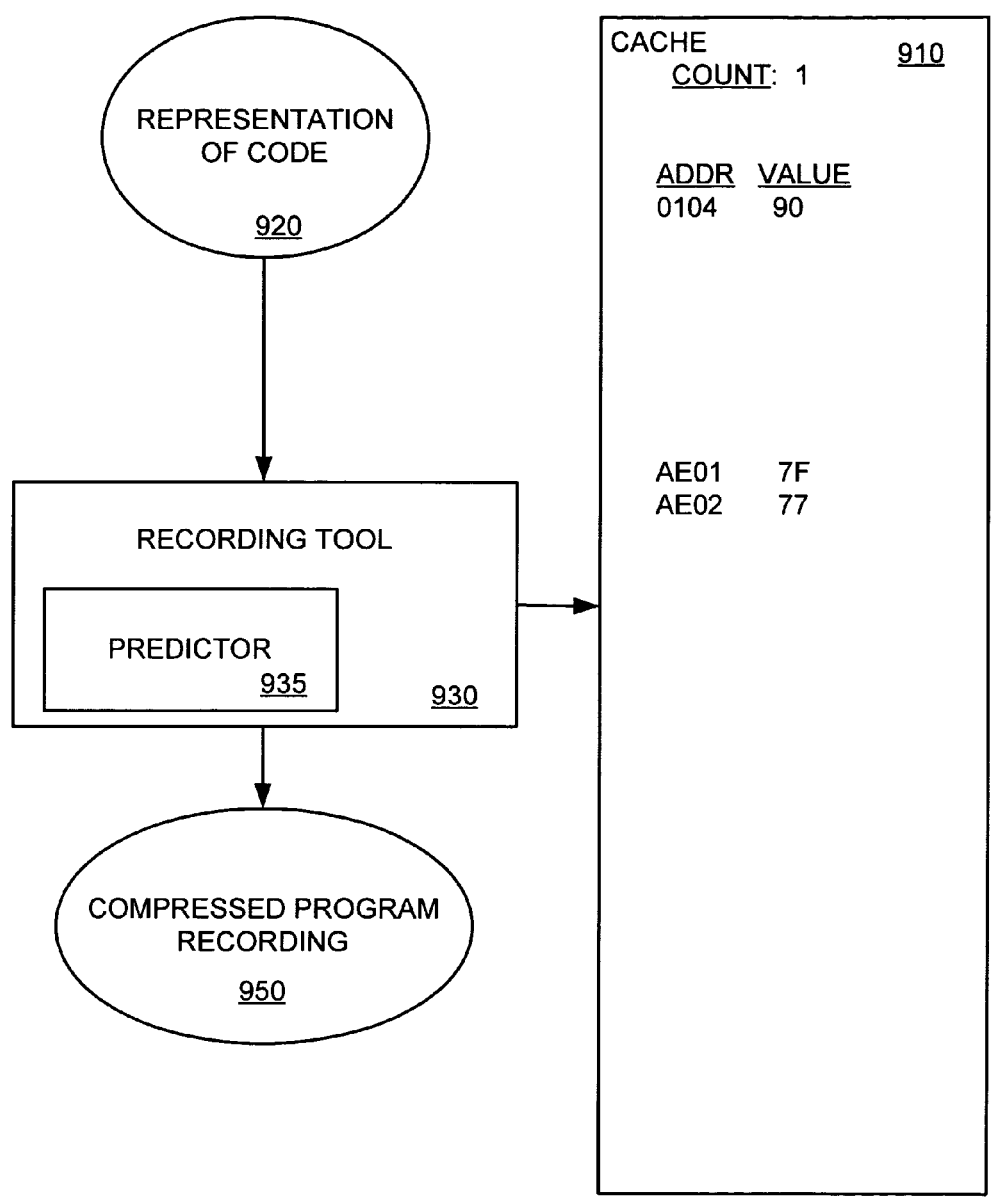
FIG. 9 is a block diagram of an exemplary system employing a cache to determine predictability of memory read operations.

Exemplary Recording System Employing a Cache to Determine Predictability of Memory Read Operations The resulting value of a memory read operation by a processor can often be predicted during playback (e.g., it will remain the same or be written to by the processor) unless it is changed by some mechanism external to that processor or some mechanism that is not monitored during program recording. FIG. 9 shows an exemplary system 900 employing a cache 910 to determine predictability of memory read operations. In the example, a representation 920 of the executable instructions of the program are accepted by a recording tool 930, that includes a predictor 935 (e.g., including a virtual processor operable to execute or simulate execution of the instructions in representation 920). The recording tool 930 can generate an appropriate compressed program recording via monitoring execution of the instructions 920.

As shown in the example, rather than storing successive predictable values for read operations, the cache 910 can include a hit count. If another read operation involves the value for the address already indicated in the cache 910, the count can simply be incremented. If a different (unpredictable) value is detected, the entry for the memory address can be stored and a new count started for the different value.

The example shows the cache after having recorded the read 520E of FIG. 5. The count in the cache 910 is set to 1 because during playback, there is one value that can be predicted (i.e., 77 for memory address AE02) without having to load another value from the compressed series 530 (e.g., the value will already have been loaded from recorded entry 540D).

After recording the read 520F, the count will be increased to 2 because during playback, there will be one more value that can be predicted (i.e., 90 for memory address 0104) without having to load another value from the compressed program recording (e.g., the value will already be known based on the write 520E).

Thus, for example, a value can be correctly predicted during playback because it has already been loaded from the compressed program recording or because a virtual processor will perform a write operation for the memory address. Recording the execution can include determining which values will be correctly predicted. Values that can be correctly predicted at playback need not be written to the compressed program recording.

Figure 10:
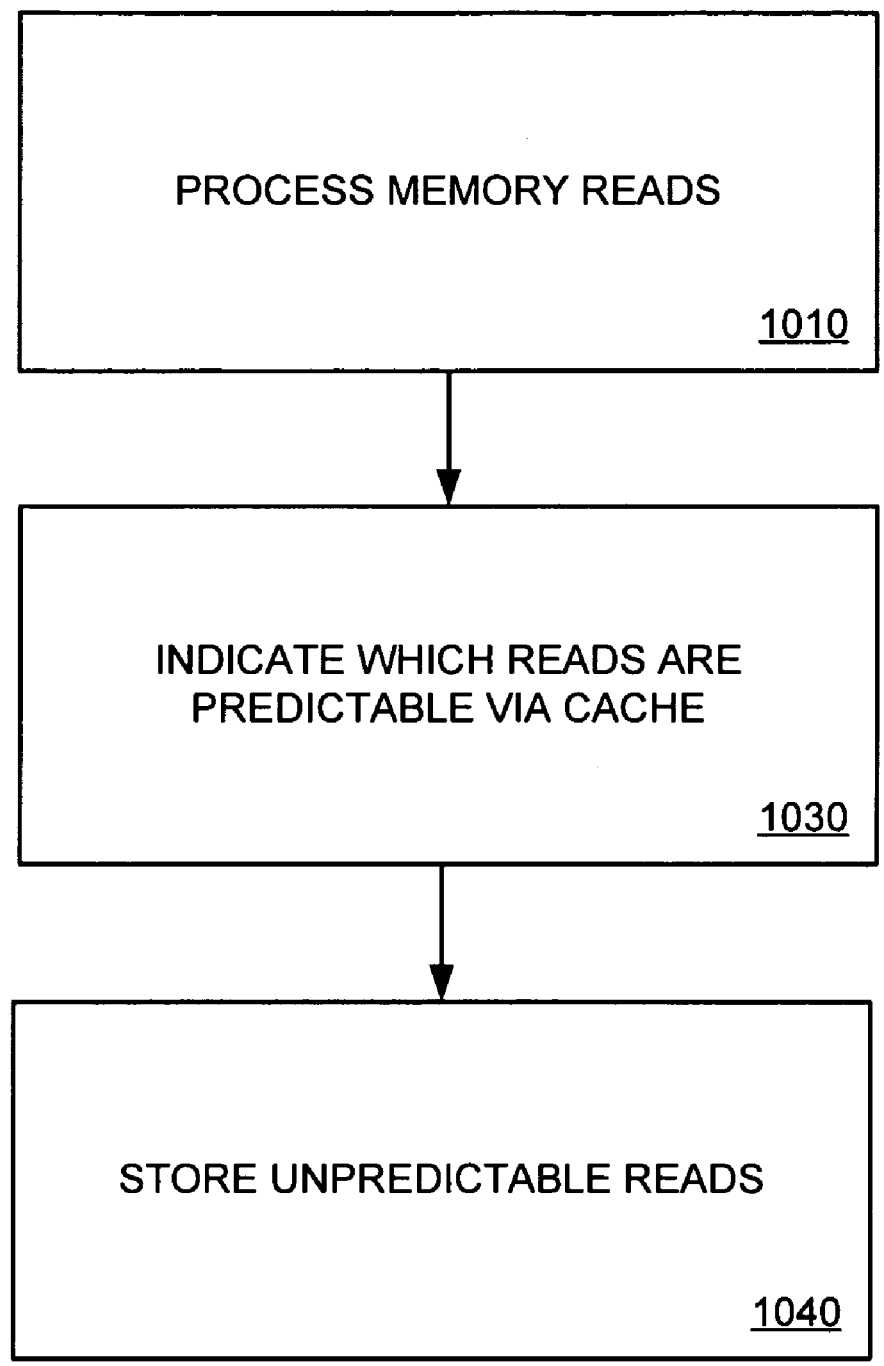
FIG. 10 is a flowchart showing an exemplary method of employing a cache to determine predictability of memory read operations.

FIG. 10 is a flowchart showing an exemplary method 1000 of employing a cache to determine predictability of memory read operations. At 1010, memory reads during monitored execution are processed. The cache can be checked to see if the memory read will be predictable at playback. If the value is predictable, the cache can be updated to so indicate at 1030. Unpredictable reads can be stored at 1040.

EXAMPLE 12

Exemplary Cache Layout

In any of the examples herein, the cache can take the form of a buffer of fixed size. An index for the cache can be computed using a calculation scheme (e.g., a modulus of the size of the cache) on the address.

The cache can be of any size (e.g., 16 k, 32 k, 64 k, and the like) as desired.

EXAMPLE 13

Exemplary Technique for Managing Cache to Reflect Predictability

Figure 11:
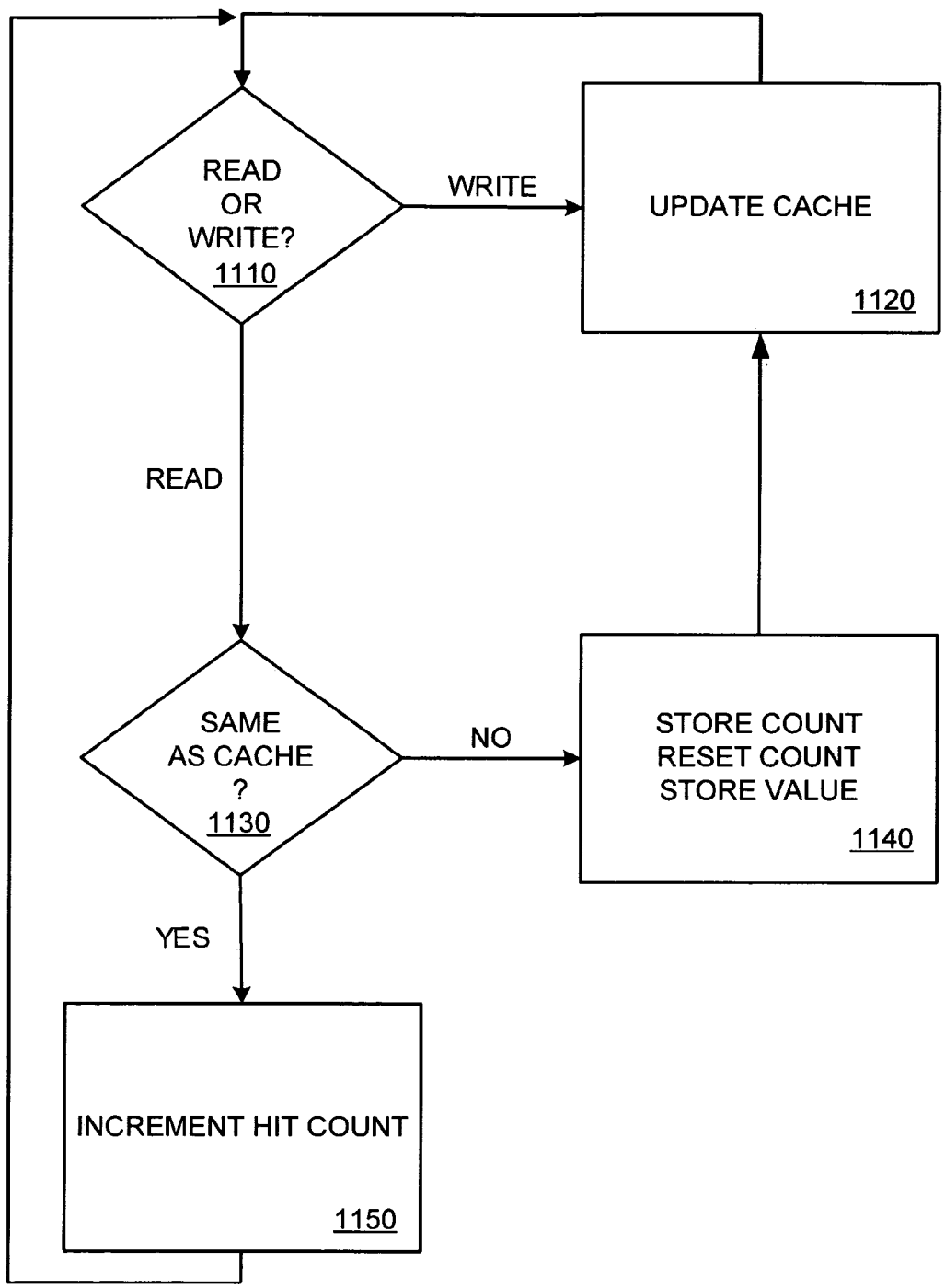
FIG. 11 is a flowchart of an exemplary method for managing a cache to reflect predictability.

FIG. 11 shows an exemplary method 1100 for managing a cache to reflect predictability. In the example, read and write operations during monitored execution of a program are analyzed to generate a compressed program recording.

At 1110, an operation during monitored execution is analyzed to determine whether it is a read or a write. If the operation is a write, the cache is updated at 1120 (e.g., the value is placed in the cache). As noted elsewhere herein, an indication that the write operation changed the value of memory need not be stored in the compressed program recording because it can be determined via execution of the executable instructions for the program.

If the operation is a read, it is then determined at 1130 whether the value involved in the read is the same as that indicated in the cache (e.g., is it predictable). If so, the hit count for the cache is incremented at 1150, and the analysis continues.

If the value is not predictable, at 1140, the count and value are stored as part of the compressed program recording (e.g., as part of the memory state changes). The count is then reset, and the cache is updated with the new value at 1120. Analysis continues on subsequent reads and writes, if any.

At the conclusion of the method, the information in the cache can be flushed (e.g., to the program recording) so that the remaining information left over in the cache is available during playback.

EXAMPLE 14

Figure 12:
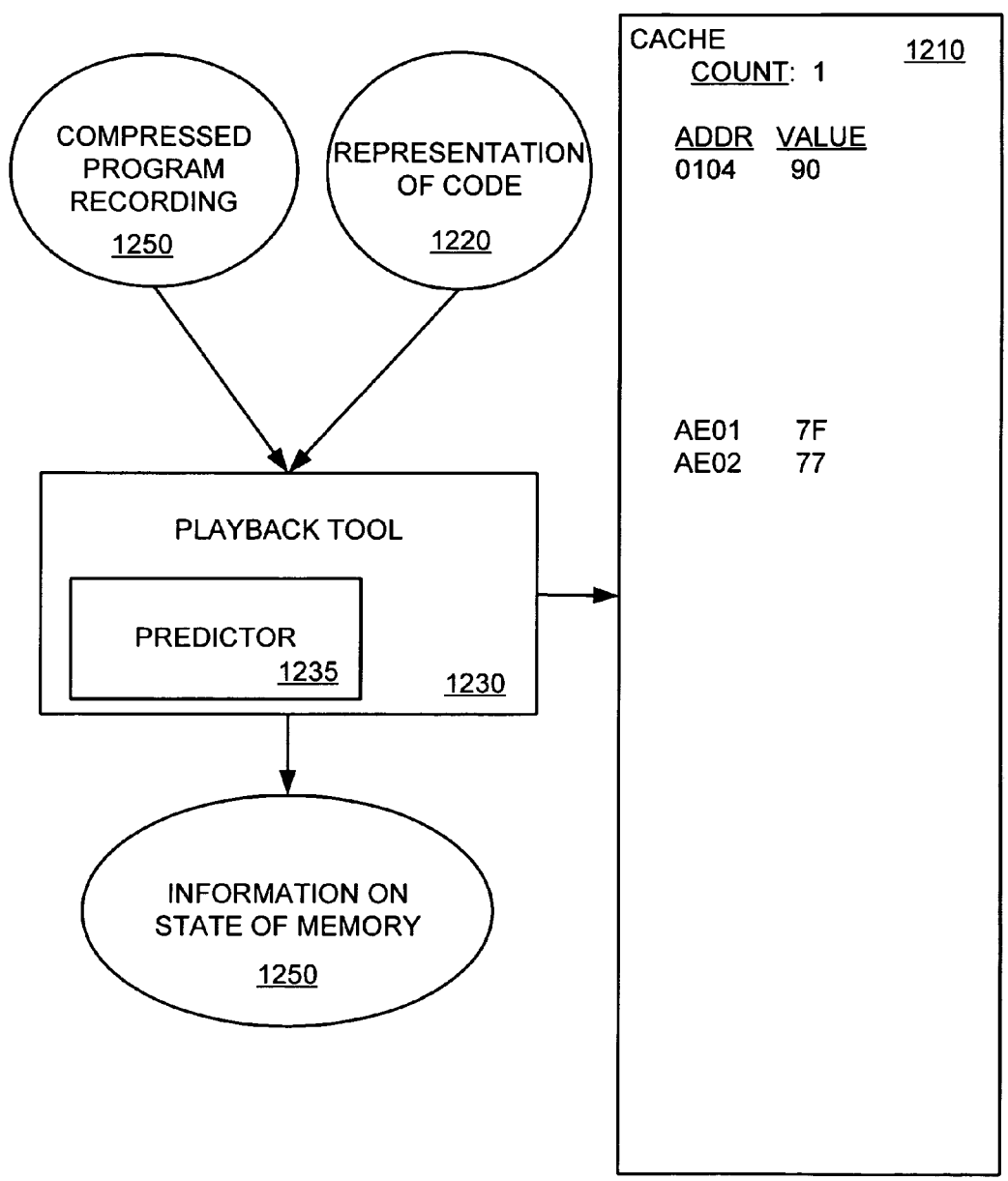
FIG. 12 a block diagram of an exemplary system employing a cache to take advantage of predictability of memory read operations during playback.

Exemplary Playback System Employing a Cache to Take Advantage of Predictability of Memory Read Operations Playback of a compressed program recording can similarly employ a caching technique to correctly determine the value of a memory address. FIG. 12 shows an exemplary system 1200 that employs a cache to take advantage of predictability of memory read operations. Such a system 1200 can be included, for example, in a debugging tool. In the example, a representation 1220 of the executable instructions of the program and a compressed program recording 1250 are accepted by a playback tool 1230, that includes a predictor 1235 (e.g., including a virtual processor operable to execute or simulate execution of the instructions in representation 1220). The playback tool 1230 can generate information (e.g., a value of an address) on the state of memory that reflects what was monitored during recording.

As shown in the example, rather than storing successive predictable values for read operations, the cache 1210 can include a hit count, which is read from the compressed program recording 1250. If a read operation involves an address and the hit count indicates the value is unchanged, the count can simply be decremented. If the count goes down to zero, a different (unpredictable) value is indicated; the entry for the memory address can then be read from the recording 1250 together with a new hit count for the cache.

The cache is thus able to store at least one value of a memory address as a single stored value that can be used plural times (e.g., reused as indicated in the hit counts) during playback to indicate successive identical values for memory read operations for the memory address according to the compressed recording.

FIG. 12 shows the cache 1210 after having played back the entries 540B and 540D and the executable instructions related to reads and writes 520A through 520E. The hit count in the cache 1210 is 1 because the count loaded from entry 1240D has now been decreased by one due to the read 520D (the value for which had already been loaded from the entry 540D. As indicated by the count, there still remains 1 value that can be correctly predicted without having to load another value from the compressed program recording at playback time (i.e., the value 90 for the read 520F can be correctly predicted due to execution of the executable instructions related to the write 520E). After the executable instructions related to the read 520F is executed, the count will be decreased again and reach zero. The next value (i.e., 8F for the address AE01) cannot be correctly predicted at playback time without loading another value from the compressed series 530. So, during playback, the entry 540G is consulted to determine the proper value.

The cache can thus store a predictable value for a memory address and a hit count indicating how many successive times the cache will correctly predict values in succession.

Figure 13:
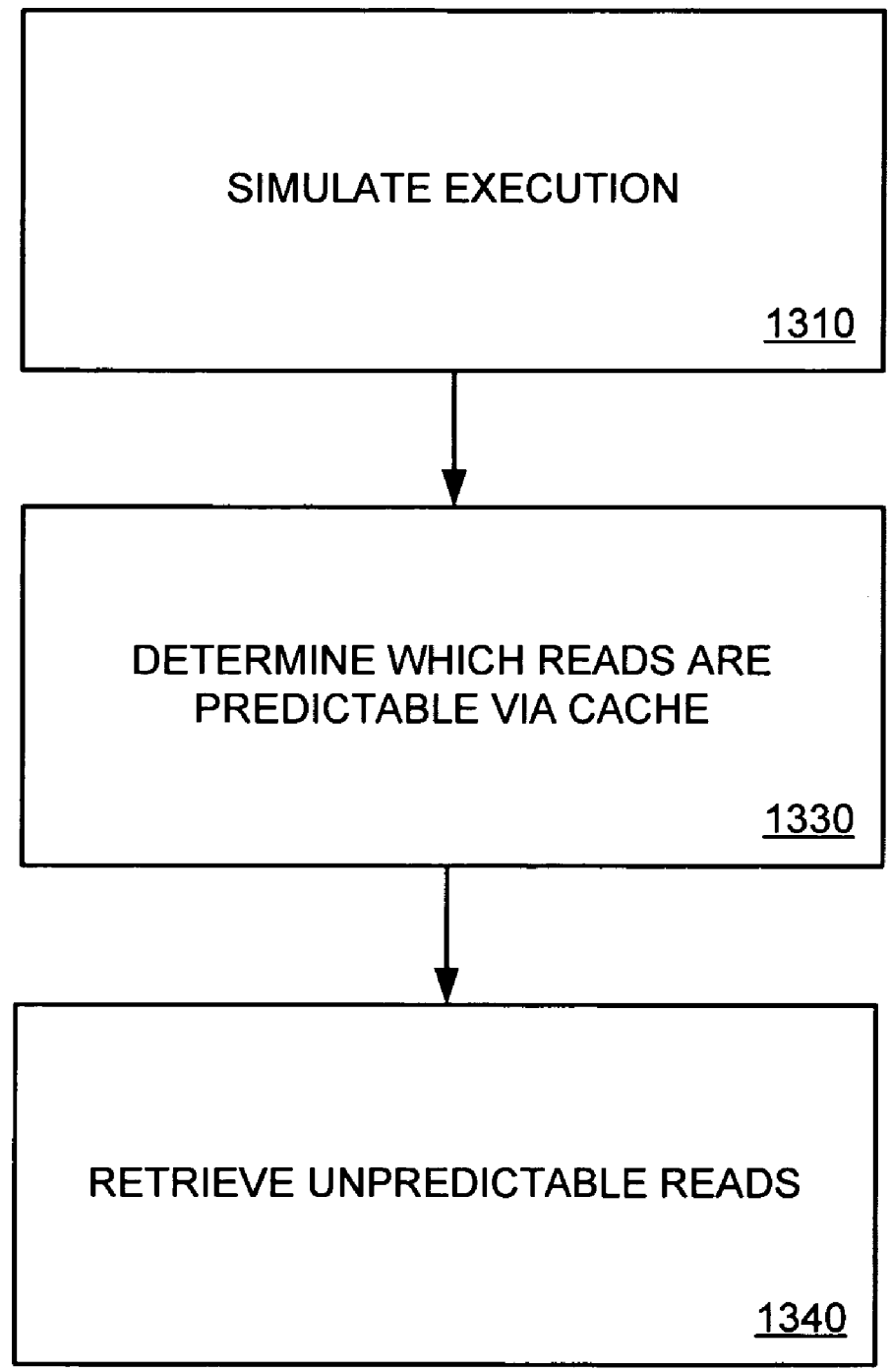
FIG. 13 is a flowchart showing an exemplary method of employing a cache to determine the value of memory read operations via predictability as indicated in a compressed program recording.

FIG. 13 is a flowchart showing an exemplary method 1300 of employing a cache to determine the value of memory read operations via predictability as indicated in a compressed program recording. At 1310, execution is simulated via representation of executable instructions for the program. Memory reads can be encountered during execution simulation. At 1330, a cache can be used to determine which reads are predictable. Unpredictable reads can be retrieved at 1340.

EXAMPLE 15

Exemplary Technique for Managing Cache to Take Advantage of Predictability

Figure 14:
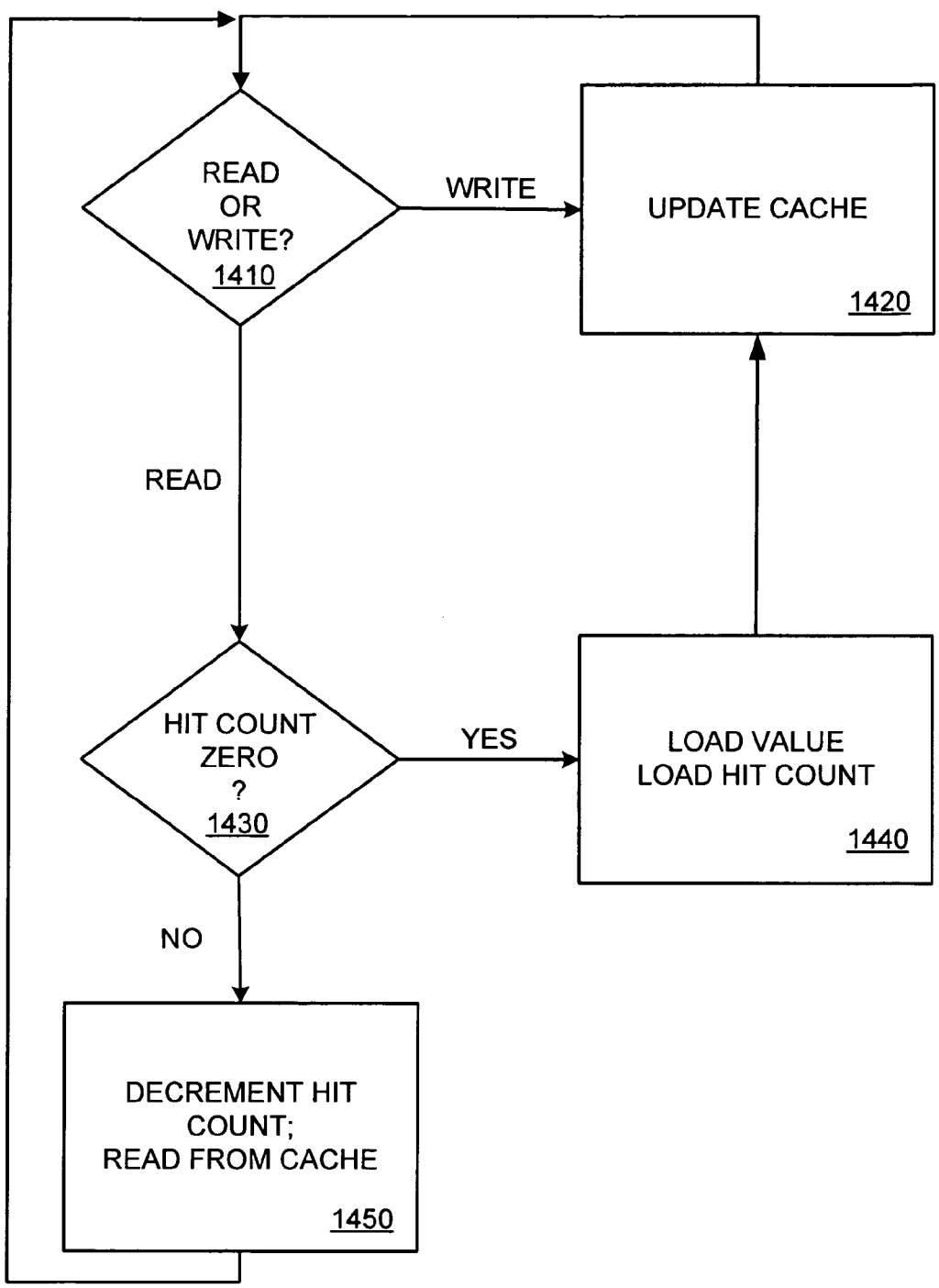
FIG. 14 is a flowchart of an exemplary method for managing a cache to take advantage of predictability.

FIG. 14 shows an exemplary method 1400 for managing a cache to take advantage of predictability as indicated in a program recording. In the example, the outcome of read and write operations are determined based on a compressed program recording containing information showing monitored values. Not all monitored values need to be included in the recording because some can be predicted. When the method 1400 is started, initial values from the program recording can be read from or written to the cache to begin. Alternatively, the cache can be reset (e.g., set to zeros) when starting both recording and playback.

At 1410, an operation during playback is analyzed to determine whether it is a read or a write. If the operation is a write, the cache is updated at 1420 (e.g., the value is placed in the cache). The value for the write can be determined via execution of the executable instructions for the program.

If the operation is a read, it is then determined at 1430 whether the hit count in the cache is zero. If not, the hit count is decremented at 1450, and the value for the read is taken from the cache.

If the hit count is zero, then a new value and new hit count are loaded (e.g., from the program recording) at 1440. The new value is used for the value of the read. At 1420 the cache is updated to reflect the new value and hit count.

Processing for further operations, if any, continues at 1410.

EXAMPLE 16

Figure 15:
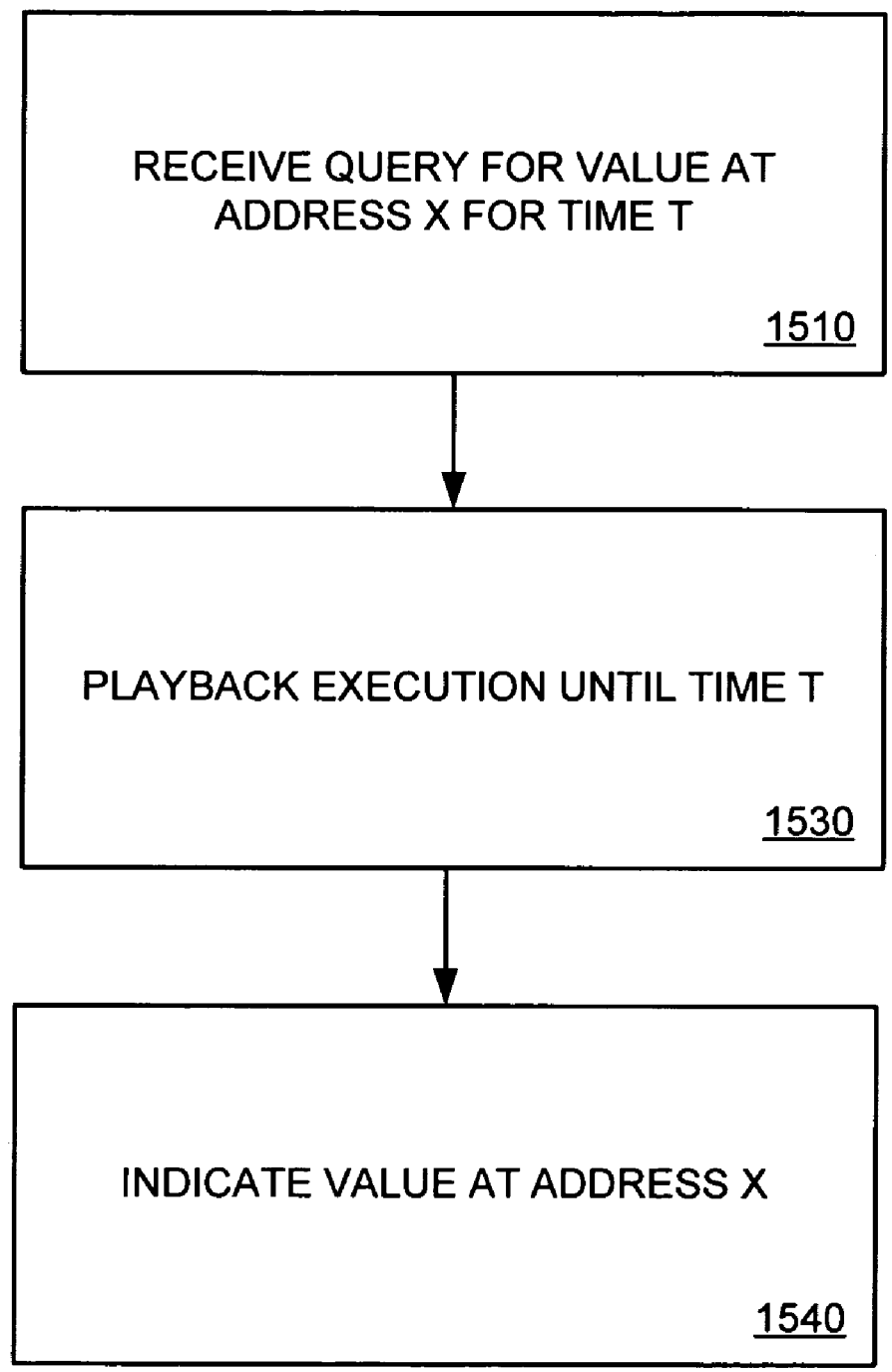
FIG. 15 is a flowchart of an exemplary method of determining a value for a memory address at a particular time.

Exemplary Method of Determining a Value for a Memory Address at a Particular Time FIG. 15 is a flowchart of an exemplary method 1500 of determining a value for a memory address at a particular time. For example, when debugging a program, a developer may wish to see what the value of a memory address is at a particular point during the program's execution.

At 1510, a query is received for the value of an address x at time t. The time may be expressed absolutely (e.g., after this instruction, after this many clock cycles, etc.) or relatively (after the next n instructions, etc.) or implicitly (e.g., at the current point during execution).

At 1530, a program recording is played back until the time t is reached using any of the techniques described herein. Then, at 1540 the value at the address x is indicated. For example, a debugging tool may show the value on a user interface.

EXAMPLE 17

Exemplary Request for Value Deep within Playback Data

FIG. 16 shows a scenario 1600 involving a request 1690 for a value of a memory location deep within the playback data of a compressed program recording 1620. Although the compressed program technique can reduce the amount of storage space and processing involved during recording and playback, a request 1690 for a value can still come deep within the playback data (e.g., after many processor cycles). The value can be determined via playback of the playback data from the beginning of the recording 1620 to the point in time for which the request 1690 is made.

EXAMPLE 18

Exemplary Key Frames within a Compressed Program Recording

Figure 17:
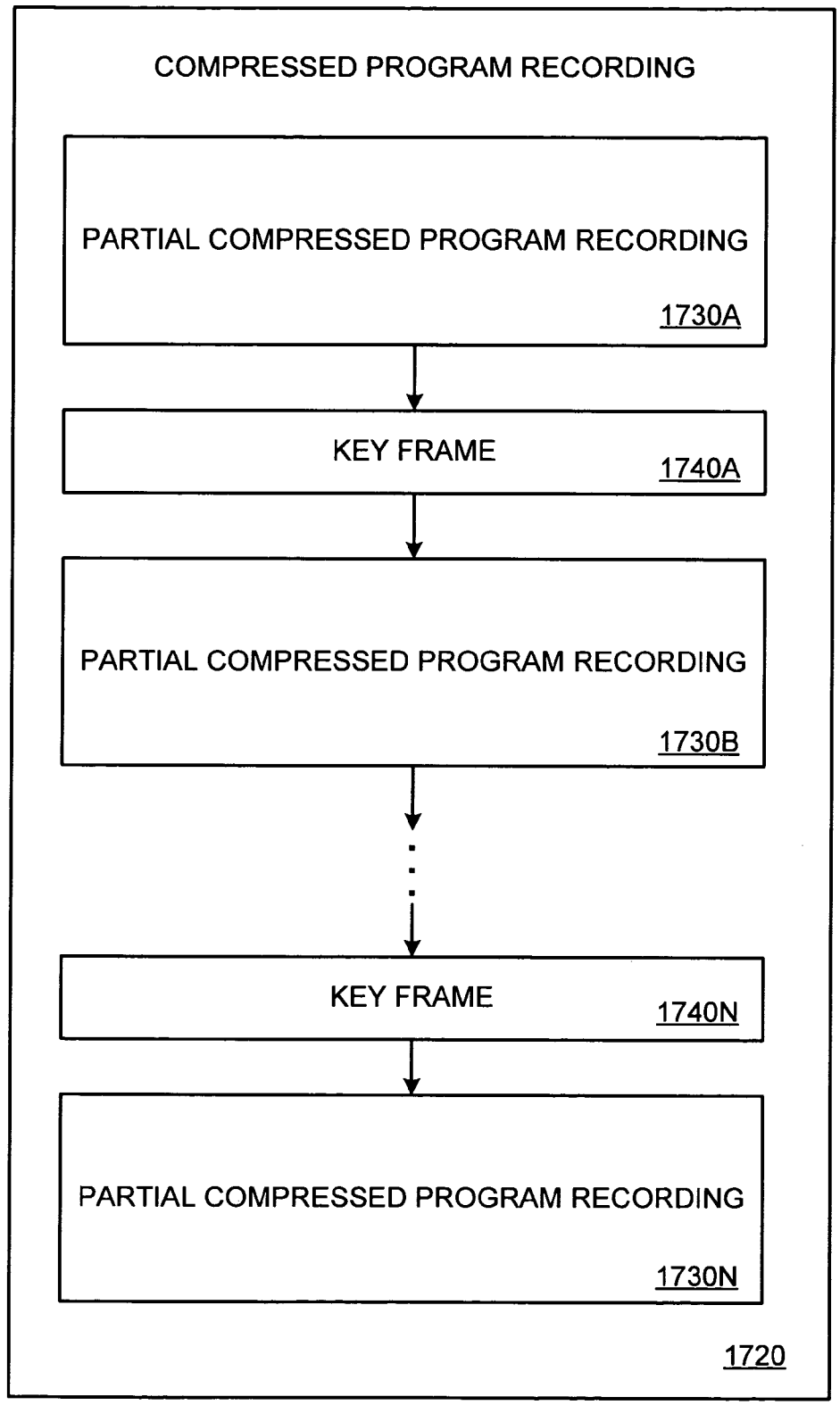
FIG. 17 is a block diagram showing exemplary use of key frames within a compressed program recording.

FIG. 17 shows a scenario 1700 involving a request compressed program recording 1720 that includes one or more key frames 1740A-1740N. A key frame can be placed in an intermediary location within the program recording and serve as an alternate starting point, rather than having to start at the beginning of the recording 1720. In this way, random access playback for the compressed program recording can be achieved (e.g., playback can begin at any key frame).

Thus, if playback begins at key frame 1740A, the instructions in the partial compressed program recording 1730A need not be played back. In some cases, such as when determining the value of a memory location that is modified subsequent to the key frame 1740A, the contents of the earlier compressed program recordings (e.g., 1730A) may be immaterial to the result and can be ignored. In this way, the amount of processing performed to determine state can be reduced.

EXAMPLE 19

Exemplary Method of Generating Key Frames

Figure 18:
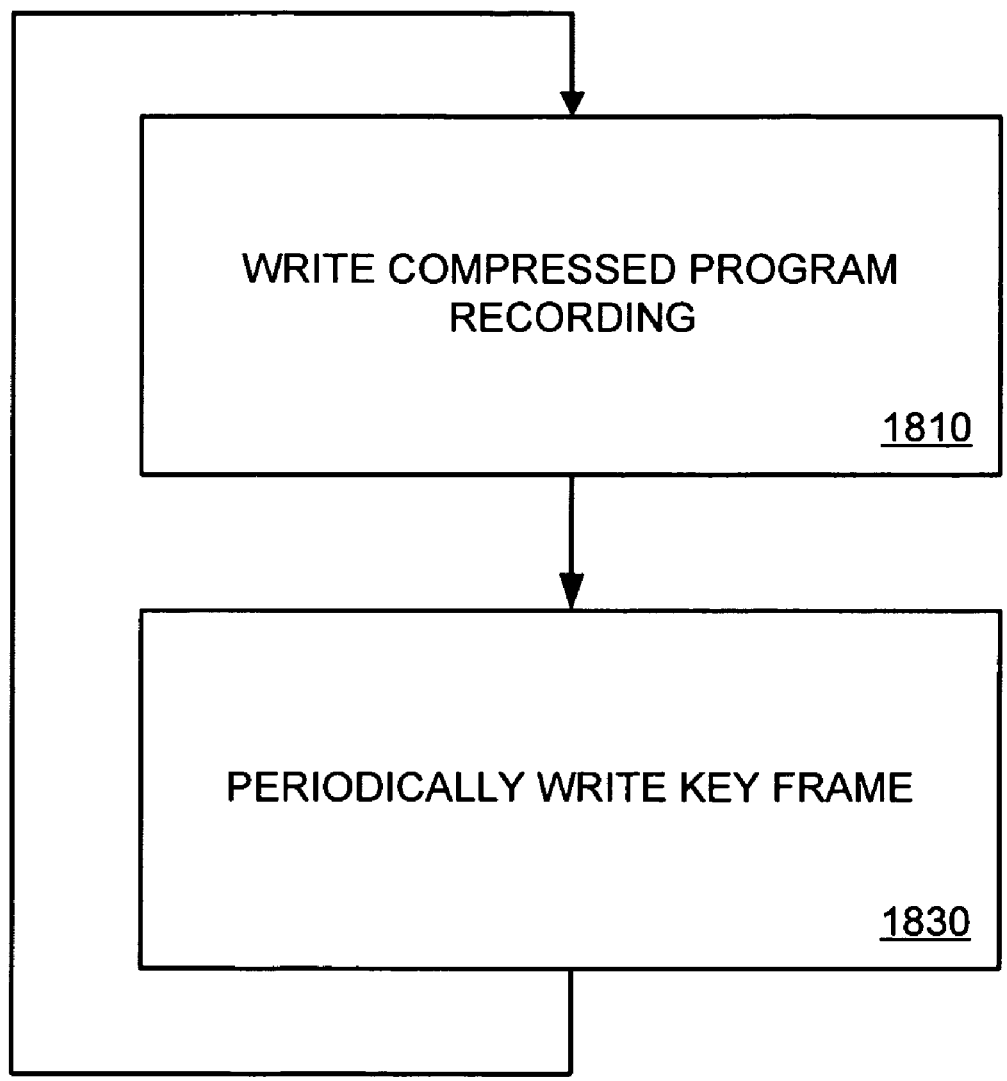
FIG. 18 is a flowchart of an exemplary method of generating key frames.

FIG. 18 shows an exemplary method 1800 of generating key frames for use in a compressed program recording. At 1810, any of the techniques described herein for writing a compressed program recording can be employed to write the compressed program recording. At 1830, a key frame is periodically written to the compressed program recording. The key frame can include the processor state at the time the key frame is written to facilitate starting at the location during playback.

In implementations involving a cache, the cache can be flushed or stored before writing the key frame. As a result, operations involving memory locations will update the cache.

The illustrated technique can involve generating key frames while the program is being monitored or at a later time. In some cases, it may be desirable to generate the key frames in response to activity in a debugger (e.g., by generating key frames for areas proximate the current time location being investigated in a debugger by a developer).

The frequency at which key frames are generated can be tuned (e.g., increased or decreased) to optimize performance and compression.

EXAMPLE 20

Exemplary Key Frame

Figure 19:
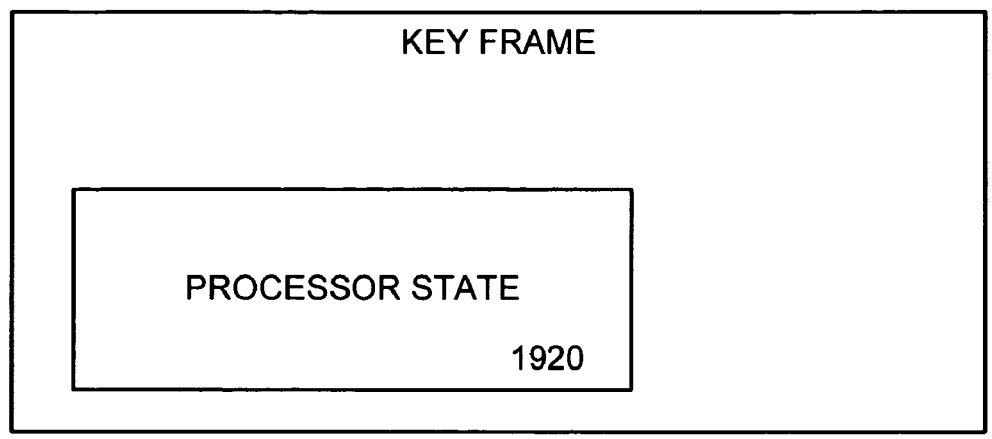
FIG. 19 is a block diagram of an exemplary key frame.

FIG. 19 shows an exemplary key frame 1900. In the example, the key frame 1900 includes the processor state 1920 at a time corresponding to the key frame's temporal location in the compressed program recording. For example, register values can be included in the processor state 1920.

The key frame need to be stored (e.g., if the cache is flushed). Alternatively, the cache could be stored (e.g., if storing results in better compression).

EXAMPLE 21

Exemplary Method of Employing a Key Frame

Figure 20:
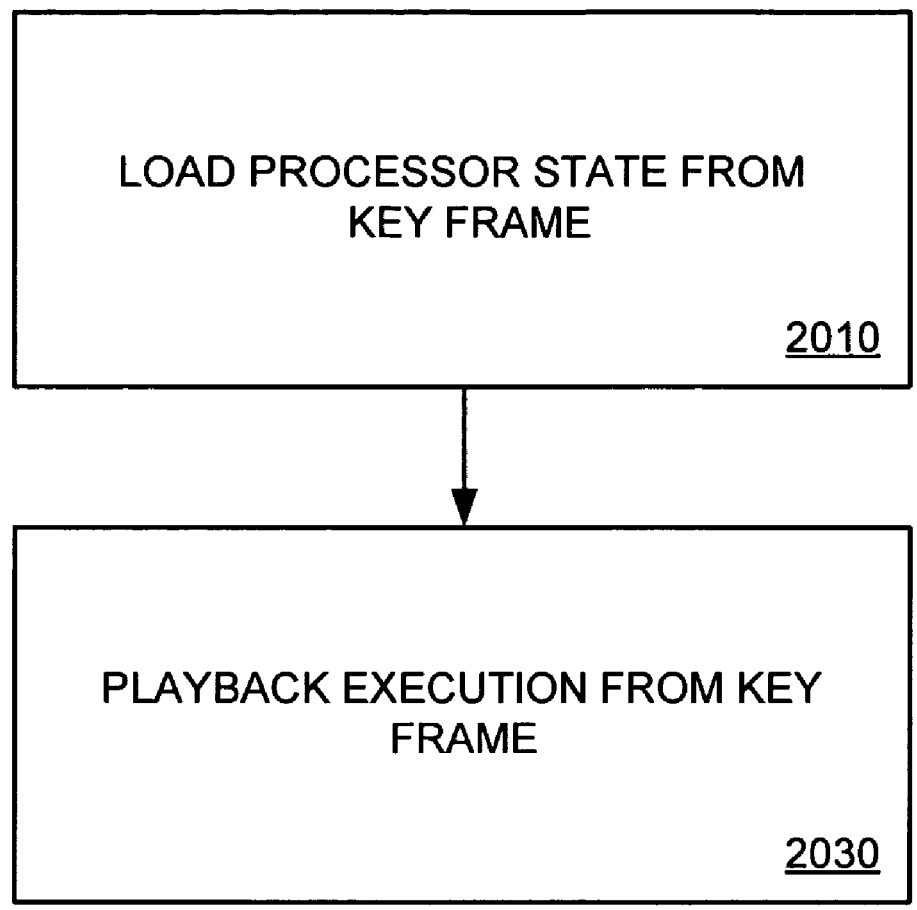
FIG. 20 is a flowchart showing an exemplary method of employing a key frame.

FIG. 20 shows an exemplary method 2000 of employing a key frame. At 2010, processor state is loaded from the key frame. At 2030, execution is played back at points in time after the key frame.

EXAMPLE 22

Figure 21:
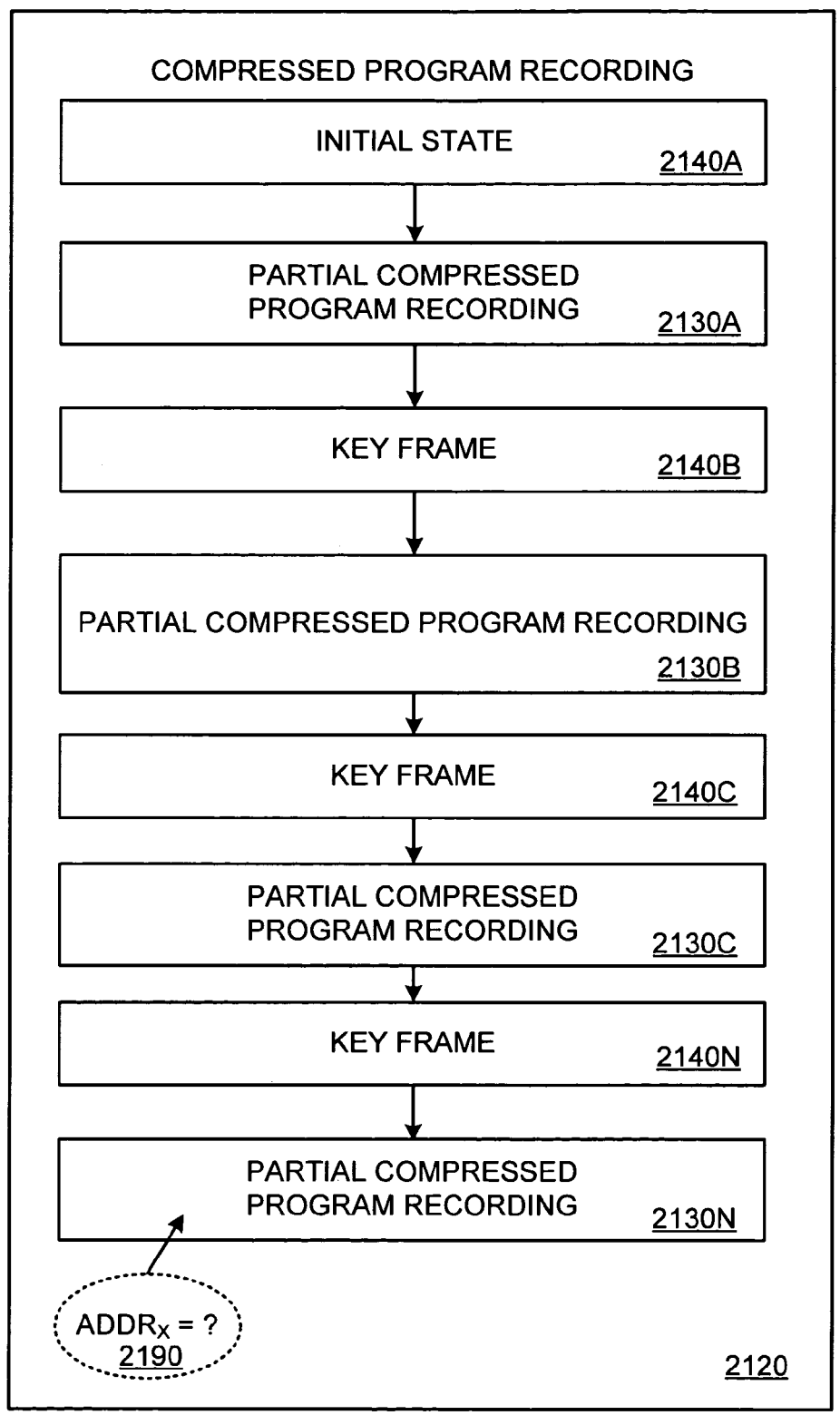
FIG. 21 shows a scenario involving a request for a memory value deep within a program recording with key frames.

Exemplary Request for Memory Value Deep within a Program Recording with Key Frames FIG. 21 shows a scenario 2100 involving a request 2190 for a memory value deep within a program recording 2120 with key frames 2140A-2140N and partial compressed program recordings 2130A-2130N.

Although the example can take advantage of the key frames 2140A-2140N, fulfilling the request 2190 may still involve considerable processing. If, for example, playback is initiated at key frame 2140N, and the value for the address x cannot be determined (e.g., does not appear in the partial compressed program recording 2130N), processing can continue to start playback at each of the key frames (e.g., in reverse order or some other order) to see if the value can be determined.

EXAMPLE 23

Exemplary Summarization Index

To avoid the searching situation shown in FIG. 21, an index can be used. A summarization index 2200 associating key frames with memory addresses is shown in FIG. 22. When a request for the value of a memory address is received, the index 2200 can be consulted to determine at which key frames playback can be commenced to determine the value. Addresses for which memory values can be determined via playback of partial compressed program recordings immediately following a key frame are associated with the key frame in the index.

If desired, more detailed information about the instructions or the instructions themselves can be stored in the index. For example, a reference to where the instructions following the key frame involving a particular memory address can be found can be stored.

If desired, basic information about key frames (e.g. when the key frame occurred and where it can be found) can also be stored in the summarization index.

EXAMPLE 24

Figure 23:
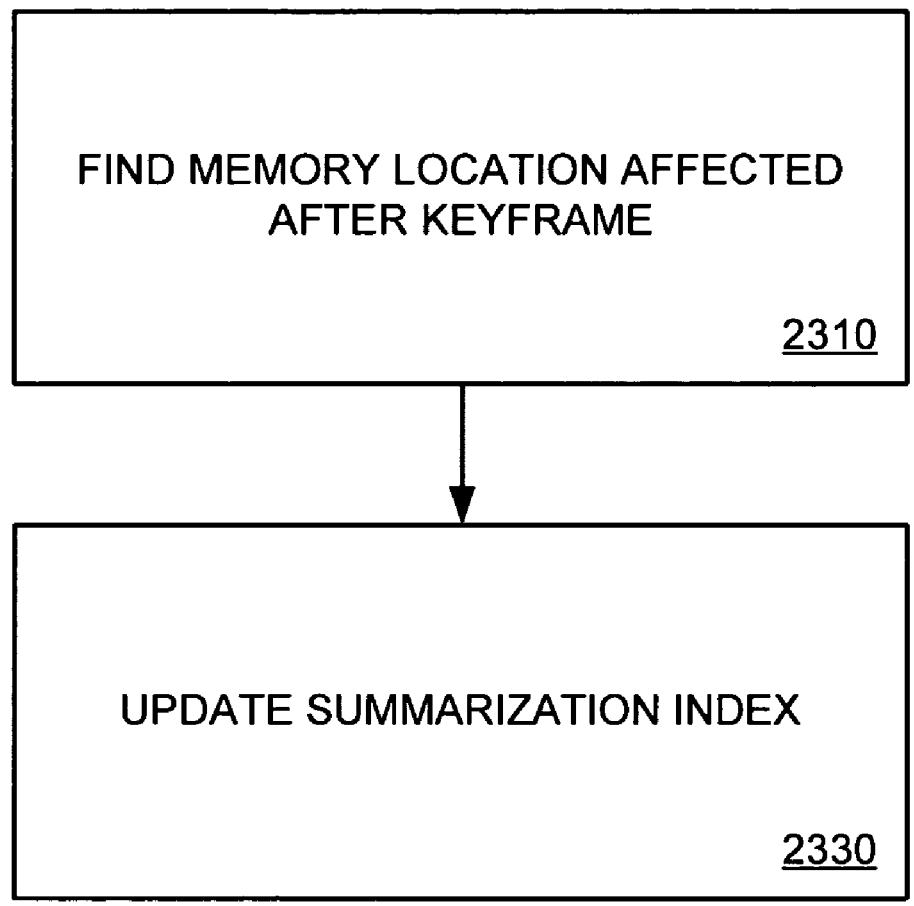
FIG. 23 is a flowchart of an exemplary method of generating a summarization index.

Exemplary Method for Generating Summarization Index and Method for Processing Requests FIG. 23 shows an exemplary method 2300 of generating a summarization index. At 2310, a memory location affected by a partial compressed program recording immediately following key frame is found. At 2330, the summarization index is updated to associate the key frame with the memory location.

Figure 24:
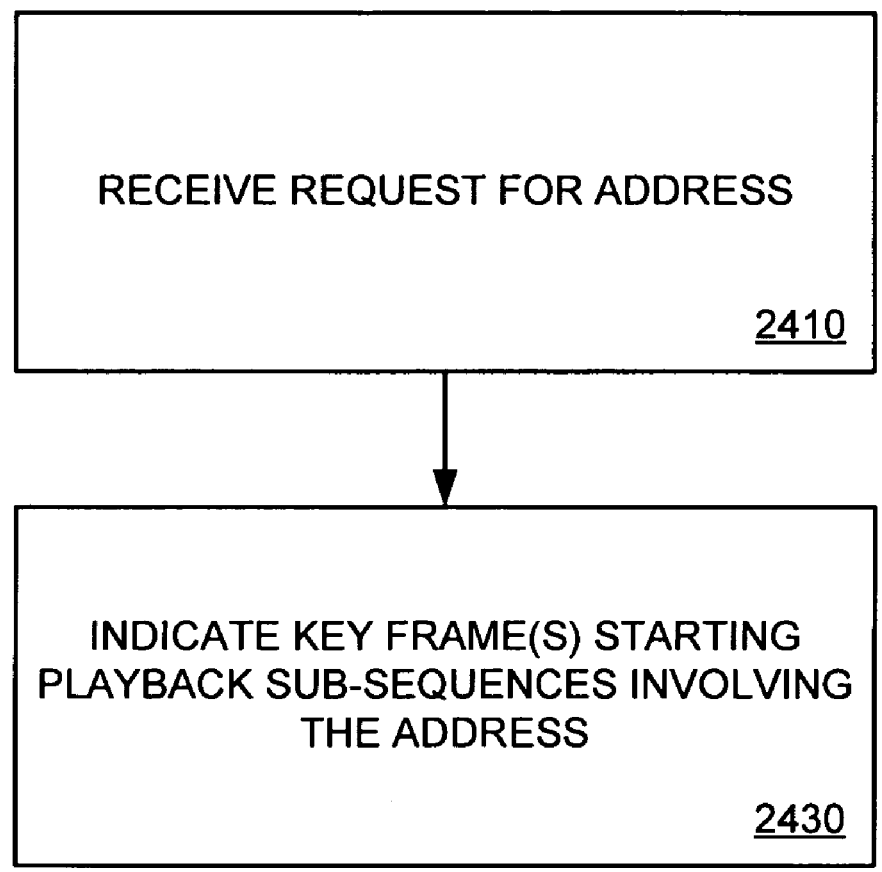
FIG. 24 is a flowchart showing an exemplary method of processing a request for finding key frames associated with a memory address.

FIG. 24 is a flowchart showing an exemplary method 2400 of processing a request for finding key frames associated with a memory address. At 2410, a request is received to find key frames for a memory address (e.g., as a result of a request to find the value of the memory address at a particular time during execution of a program under test).

Using the index, the key frame(s) are found. At 2430, the one or more key frames starting playback sub-sequences involving the address (e.g., from which the value of the address can be determined, such as those sub-sequences involving reads or writes of the address) are indicated.

In practice, playback can then begin at the key frame closest to and earlier than the time location for which the value of the memory address was requested.

EXAMPLE 25

Figure 25:
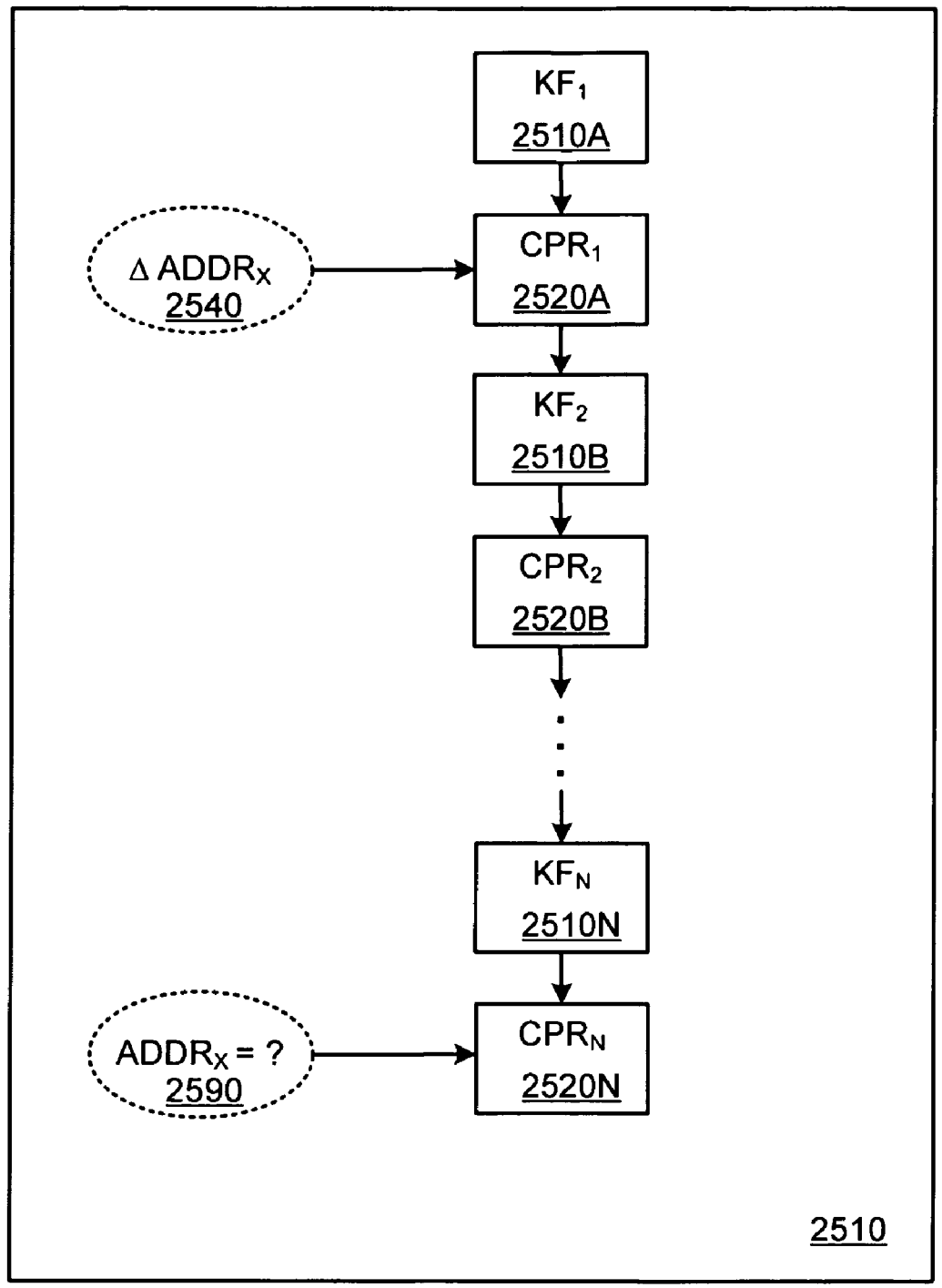
FIG. 25 shows a scenario involving a change to a memory address at a time remote from the time for which the value of the memory address was requested.

Exemplary Scenario Involving Change to Memory Address Remote from Time of Request FIG. 25 shows a scenario 2500 involving a change 2540 to a memory address at a time remote from the time 2590 for which the value of the memory address was requested. In the example, a compressed program recording 2510 includes a plurality of key frames 2510A-2510N and partial compressed program recordings 2520A-2520N.

Responsive to receiving the request 2590, a considerable amount of processing may need to be done to determine the value of the address x. Even taking advantage of the key frames may involve executing several of the subsequences 2520A-N to determine within which the memory location appears. And, even with the summarization index, the partial compressed program recording 2520 is consulted. In a program involving a large number of instruction cycles, it may not be efficient to load data for replay to determine activity so remote in time.

EXAMPLE 26

Exemplary Snapshots

Figure 26:
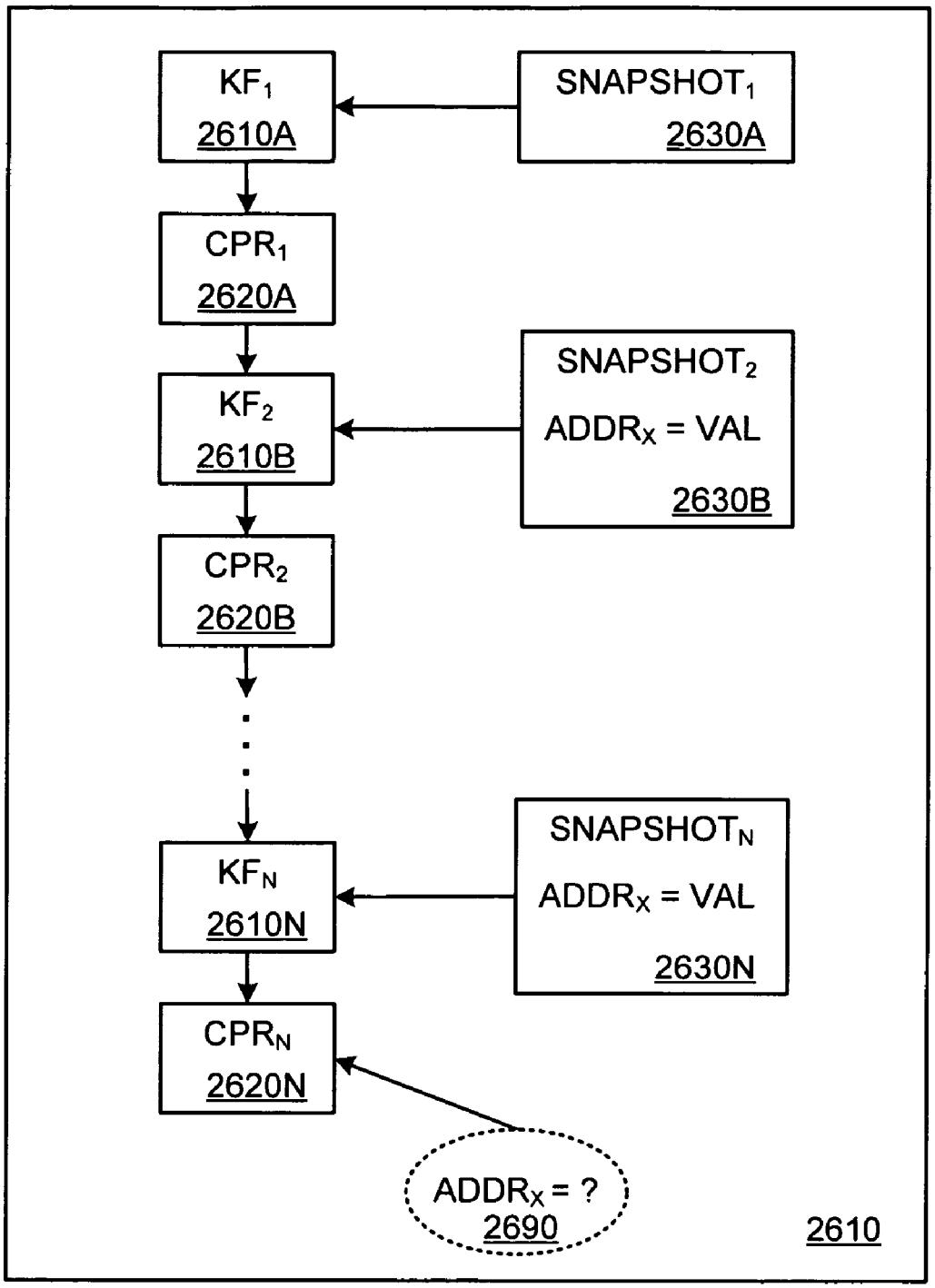
FIG. 26 is a block diagram showing the use of snapshots to store values for a set of memory locations.

FIG. 26 shows a system 2600 that involves a compressed program recording 2610 storing snapshots of memory locations. In the example, in addition to the key frames 2610A-2610N and the partial compressed program recordings 2620A-2620N, one or more snapshots 2630A-2630N are included in the compressed program recording 2610.

The snapshots 2630A-2630N can include a list of memory addresses and their associated values at the point in time during execution associated with the respective snapshot. Accordingly, a request 2690 for the contents of a memory address x can be fulfilled without having to replay the compressed program recording at which the memory address can be found. Instead, the closest snapshot before the request can be consulted (e.g., snapshot 2630N).

Figure 27:
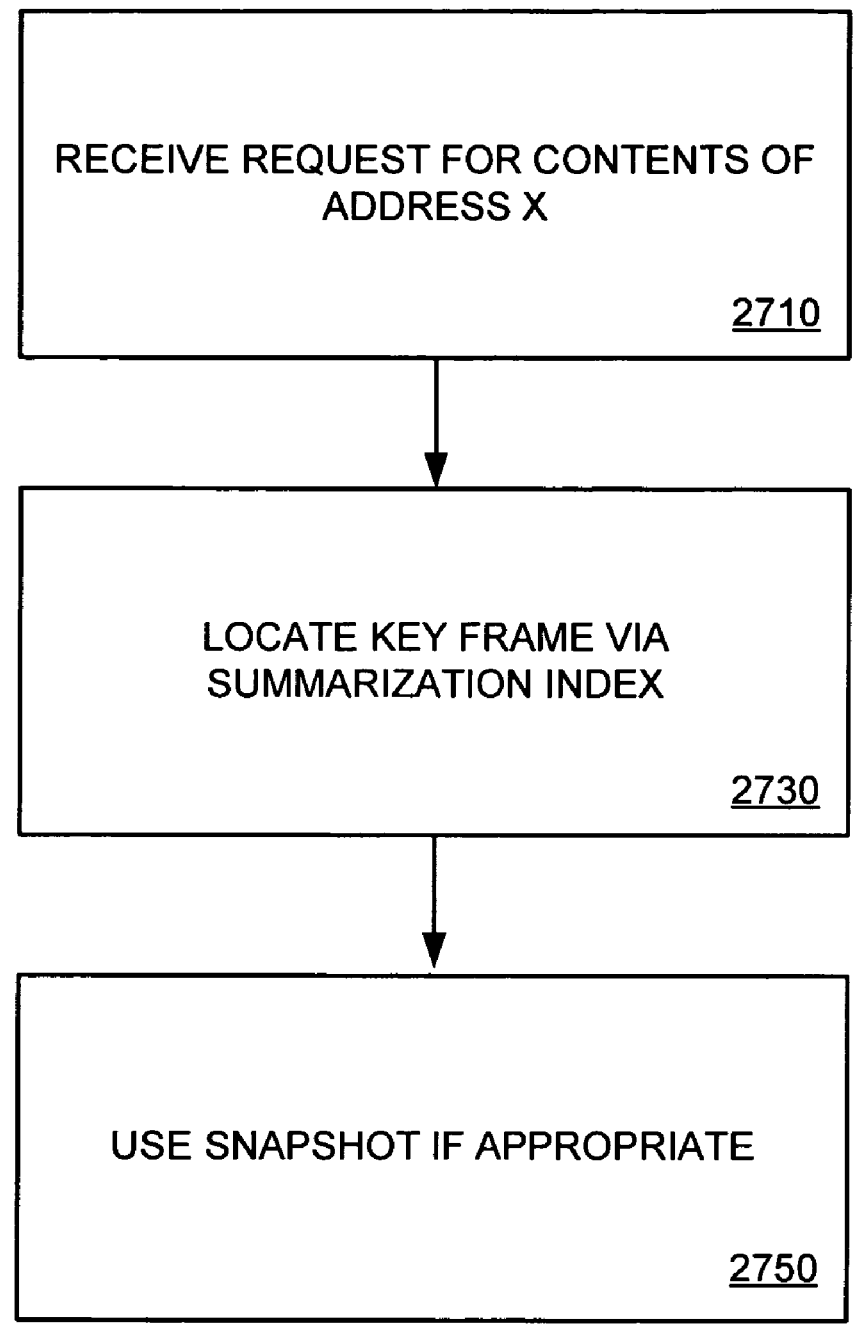
FIG. 27 is a flowchart showing an exemplary method of processing a request for the value of a memory address using one or more snapshots.

FIG. 27 is a flowchart showing an exemplary method 2700 of processing a request for the value of a memory address using snapshots. At 2710, a request for the value of address x is received (e.g., for a particular time within execution of a program). At 2730, key frame(s) are located via a summarization index. A snapshot of memory locations is used at 2750 if appropriate.

EXAMPLE 27

Exemplary Method of Processing a Request for Memory Address Value

Figure 28:
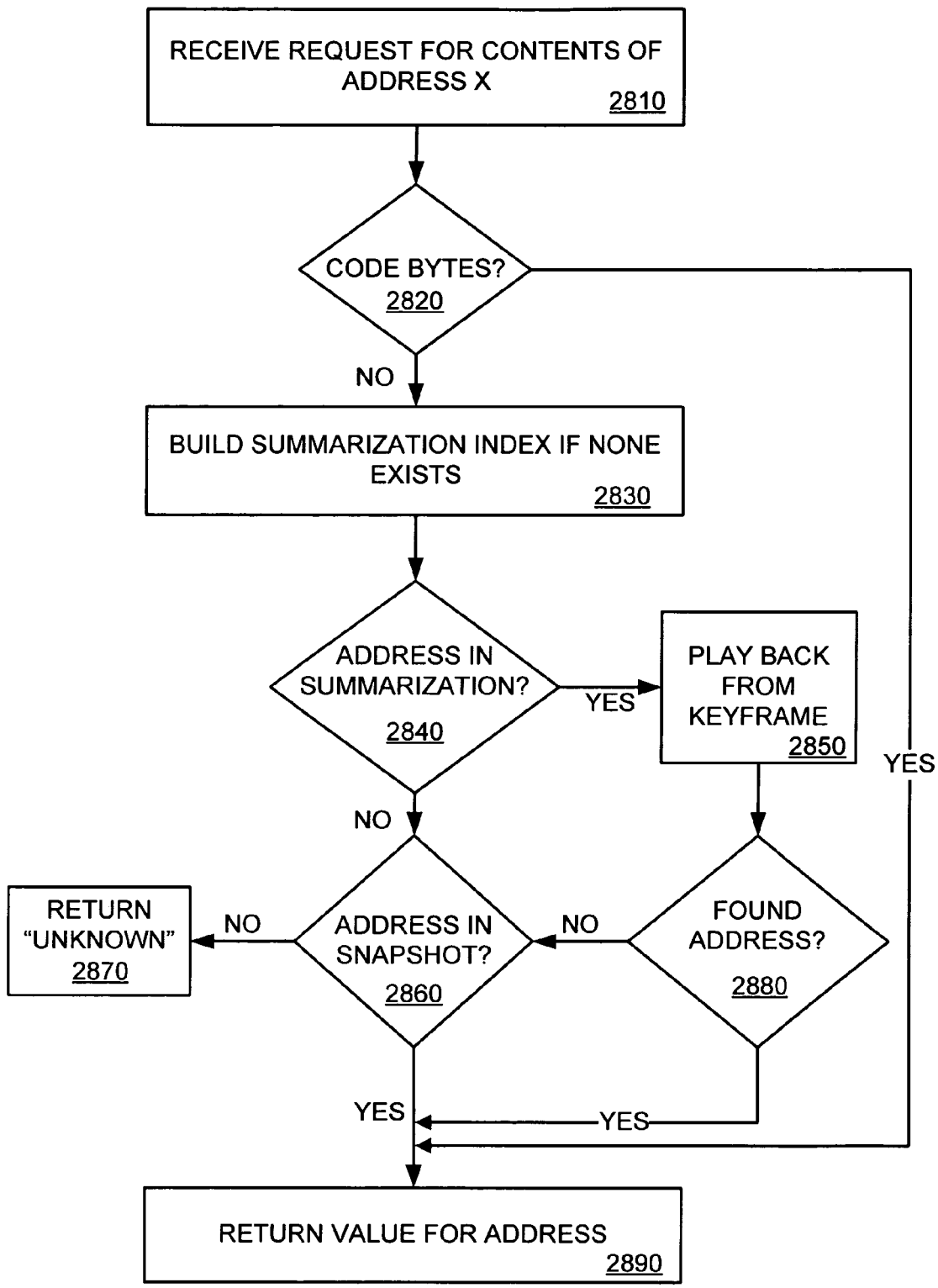
FIG. 28 is a flowchart of a method of processing a request for the value of a memory address using one or more snapshots and a summarization index.

FIG. 28 is a flowchart of a method 2800 of processing a request for the value of a memory address using one or more snapshots and a summarization index; the method 2800 can be used in conjunction with any of the examples described herein.

At 2810, a request for the contents of address x is received. At 2820, it is determined wither the address is in the code space. If it is, the value for the code bytes are returned at 2890.

At 2830, it is determined whether there is a summarization index for the current position (e.g., of execution within the program recording). If not, one is built that goes back from the current position to a point in execution (e.g., a sequence) where a snapshot exists. In some cases, it may be desirable to go back more than one snapshot (e.g., in anticipation of additional requests for other addresses). For example, the summarization index can go back two, three, or more snapshots.

At 2840, it is determined whether the address is accessed in the summarization index. If it is, at 2850, playback begins from the keyframe and finds the instruction that accesses the address to determine the value. At 2880, if the address was found, the value is returned at 2890.

If the address was not found, at 2860, it is determined whether the address's value is in the snapshot that the summarization index borders. If so, the value is returned at 2890. Otherwise, the address is not referenced in the compressed program recording, and an "address unknown" result can be returned. In practice, such a result can be indicated to a user as a series of question marks (e.g., "???").

The number of summarizations can be tuned for performance. In practice, snapshots tend to be larger than summarizations, so having too many snapshots can degrade performance. But, having fewer snapshots typically involves more simulation (e.g., via a virtual processor), and simulation is more efficient when a summarization can be consulted to determine where to simulate.

EXAMPLE 28

Exemplary Compressed Program Recording Supporting Multiple Processors

Figure 29:
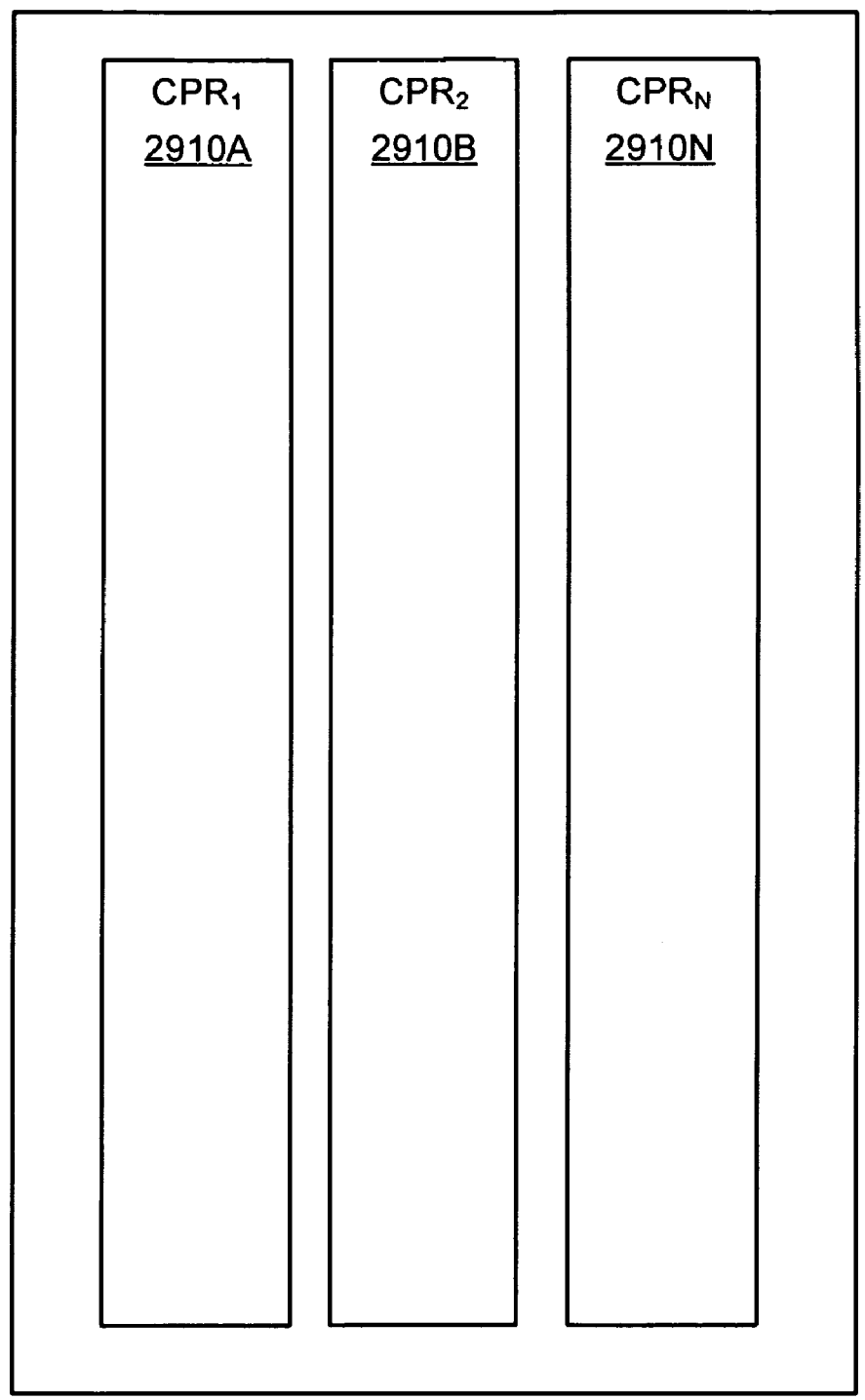
FIG. 29 is a block diagram of a compressed program recording supporting multiple processors.

FIG. 29 shows an exemplary compressed program recording 2900 supporting multiple processors. In the example, a recording 2900 comprises two or more compressed program sub-recordings 2910A-2910N for respective processors.

For example, each of the sub-recordings can be a stream or some other arrangement of data indicating a compressed program recording generated via monitoring state changes for a respective processor.

Thus, execution of a program that runs on multiple processors can be recorded. A similar arrangement can be used for multiple threads, or multiple processors executing multiple threads can be supported.

EXAMPLE 29

Figure 30:
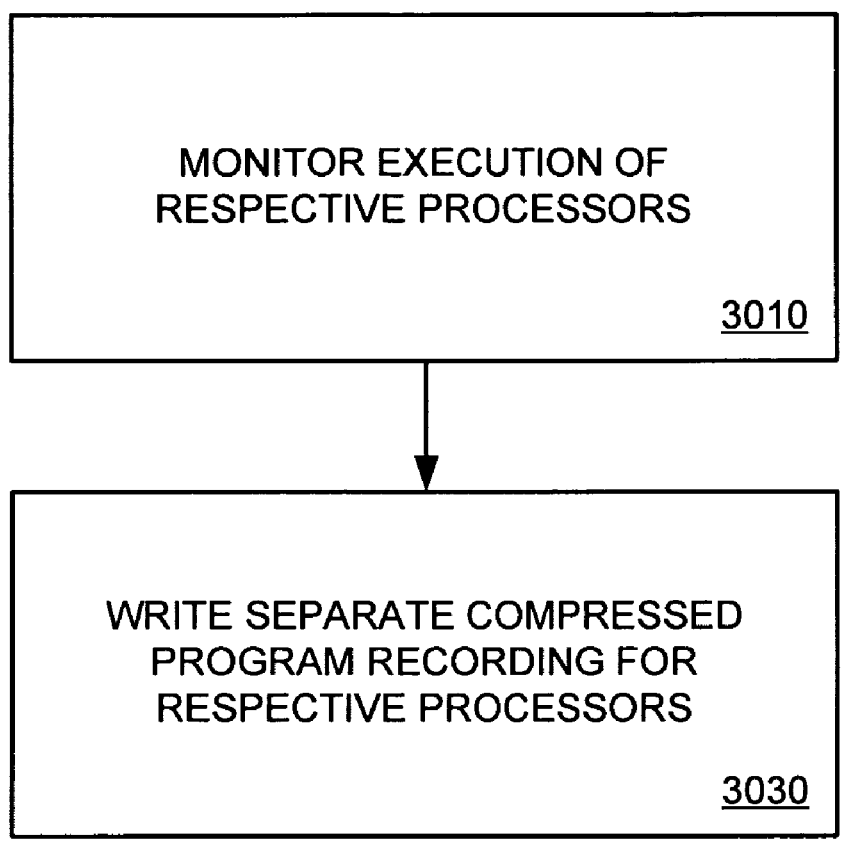
FIG. 30 is a flowchart of an exemplary method of generating a compressed program recording supporting multiple processors.

Exemplary Method for Generating Compressed Program Recording Supporting Multiple Processors FIG. 30 shows an exemplary method 3000 of generating a compressed program recording supporting multiple processors. At 3010, execution of respective processors (e.g., state changes for the processors) are monitored.

At 3030, a separate compressed program recording is written for respective processors. Again, a similar arrangement can be used for multiple threads, or multiple processors executing multiple threads can be supported.

EXAMPLE 30

Figure 31:
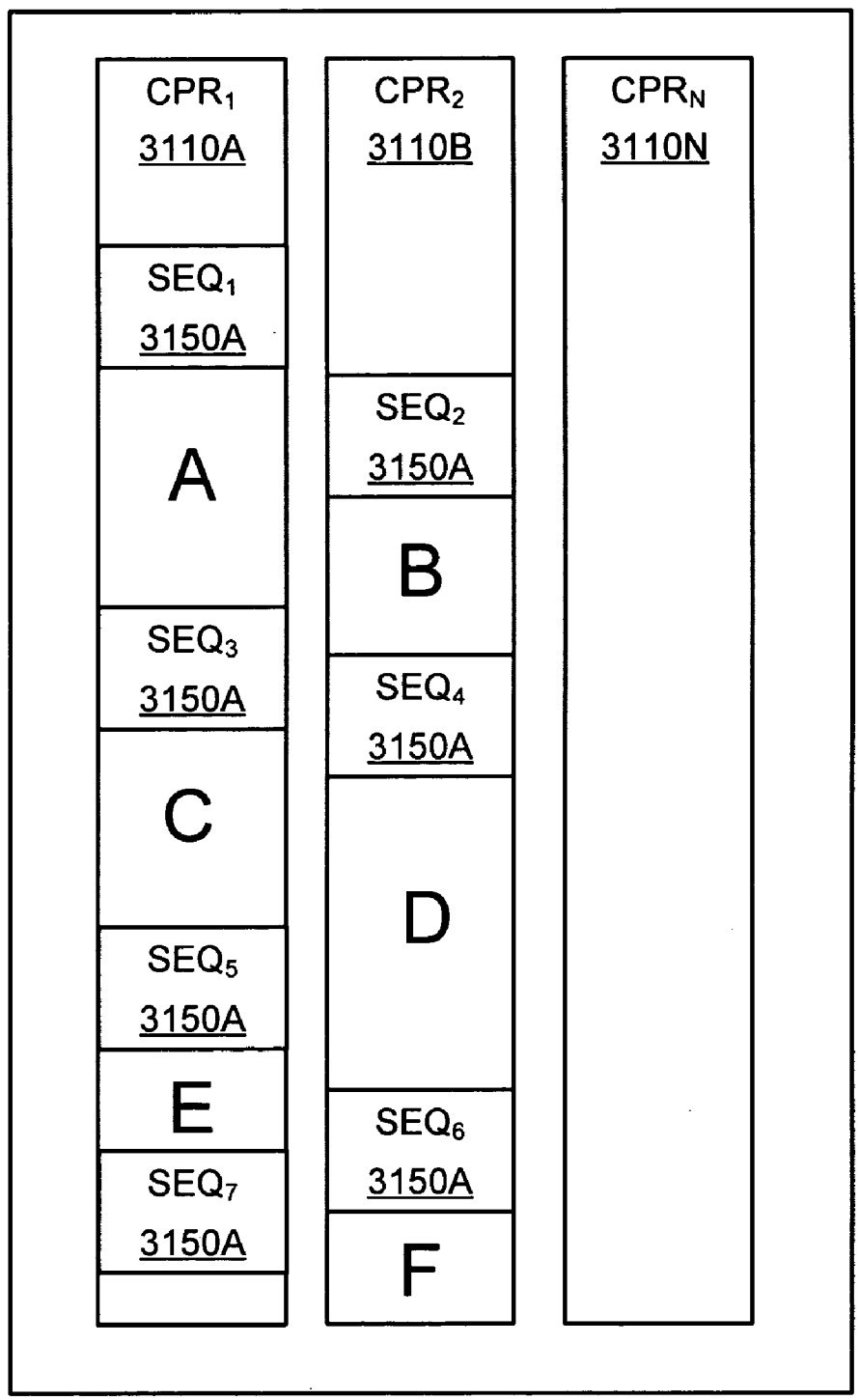
FIG. 31 is a block diagram of a compressed program recording supporting multiple processors with sequence indications for synchronization.

Exemplary Compressed Program Recording Supporting Multiple Processors with Sequence Indications FIG. 31 shows an exemplary compressed program recording 3100 with compressed program sub-recordings 3110A-3110N for two or more separate processors. Included in the recording 3100 are sequence numbers 3150A-3150G. The sequence numbers can be used to help determine the order of the various segments of the sub-recordings 3110A-3110N. For example, it can be determined that the segment A for the recording 3110A for one processor is executed before the segment D for the recording 3110B for another processor.

In some cases, the sequences may not be dispositive. For example, it may not be conclusively determined that segment B for the recording 3110B executes after segment A for the recording 3110A. In such a case, when a request for the value of a memory address is received, multiple values may be returned. Such multiple values can be communicated to the developer (e.g., in a debugger) and may be indicative of a program flaw (e.g., a likely race condition).

Figure 32:
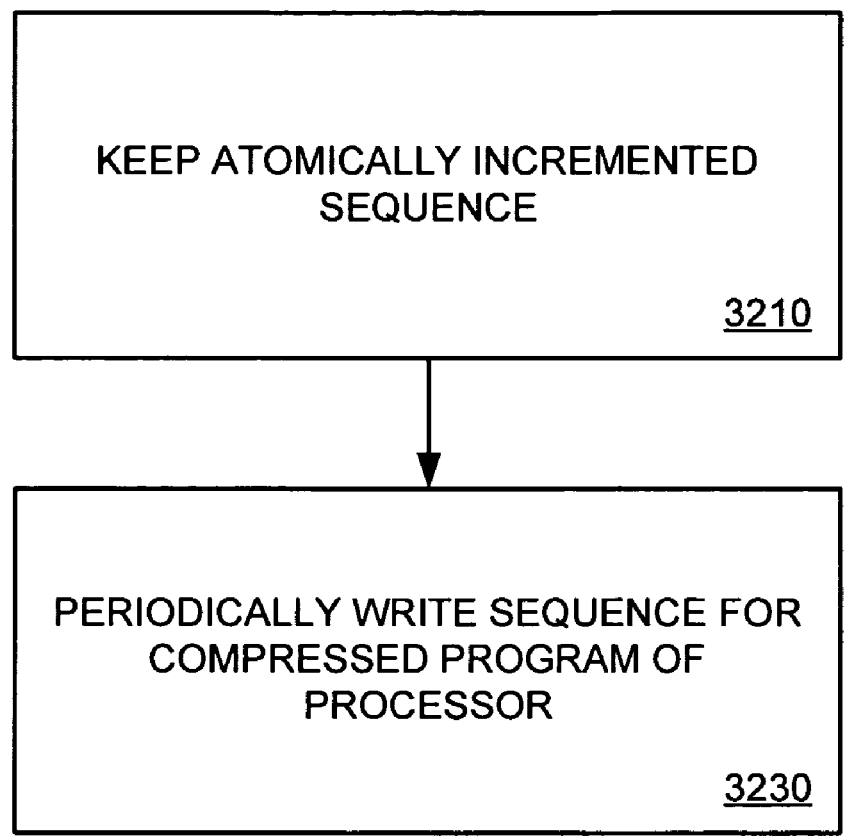
FIG. 32 is a flowchart of an exemplary method for generating sequence numbers for a compressed program recording supporting multiple processors.

FIG. 32 shows an exemplary method 3200 for generating sequence numbers for a compressed program recording supporting multiple processors. In the example, an atomically-incremented sequence number (e.g., protected by a lock) can be used.

At 3210, the atomically incremented sequence number is maintained and incremented atomically when needed (e.g., an increment-before-write or increment-after-write scheme can be used). At 3230, the sequence is periodically written to the compressed program subsequence.

The sequence writes can be triggered by a variety of factors. For example, whenever a lock or synchronization instruction (e.g., inter-thread atomic communication instructions such as compare-and-exchange and the like) is encountered, the sequence can be written. Also, whenever the program goes into or out of kernel mode, the sequence can be written. For further analysis, the instructions between a pair lock instructions can be associated with the first instruction of the pair.

EXAMPLE 31

Execution by Simulator

In any of the examples herein, monitored execution can be accomplished by using a software simulation engine that accepts the program under test as input. In this way, specialized hardware can be avoided when monitoring execution. Similarly, playback can consult a software simulation engine as part of the playback mechanism (e.g., as a predictor).

EXAMPLE 32

Function Calls

Any of the technologies herein can be provided as part of an application programming interface (API) by which client programs can access the functionality. For example, a playback tool can expose an interface that allows a program to query values for memory locations, single step execution, and the like.

Further, a client can indicate via function call that it is particularly interested in a range of instructions. In response, key frames can be created during replay for the instructions within the range. Such an approach allows fast random access to positions close to the area of interest in the trace while still allowing for efficient storage of information outside the client's area of interest.

EXAMPLE 33

Circular Buffer

In practice, during program recording, the compressed program recording can be buffered in memory before writing to disk. A circular buffer technique can be used whereby writing to disk is not necessary.

For example, as long as the buffer is large enough to hold a key frame and the information between the key frame and the next key frame, then some of the program's state can be recreated. In practice, with a large circular buffer, typically many key frames are used to support random access.

When using the circular buffer, a threshold size can be specified. When the amount of information for a compressed program recording exceeds the threshold, information from the beginning of the recording is overwritten with later information.

Such an approach can be useful because it is often the end of a recording that is of interest (e.g., shortly before a crash).

The threshold size can be any size accommodated by the system (e.g., 50 megabytes, 100 megabytes, 150 megabytes, and the like).

EXAMPLE 34

Exemplary Additional Compression

In any of the examples described herein, the information in a compressed program recording can be further reduced in size by applying any compression algorithm. For example, streams of information about read operations can be compressed, indexes can be compressed, summarization tables can be compressed, or some combination thereof. Any number of compression techniques (e.g., a compression technique available as part of the file system) can be used.

EXAMPLE 35

Different Machine Type

The compressed program recording can be saved in a format that can be transferred to another machine type. For example, execution monitoring can be done on one machine type, and playback can be performed on another machine. Portable compressed program recordings are useful in that, for example, execution can be monitored on a machine under field conditions, and playback can take place at another location by a developer on a different machine type.

To facilitate portability, the executable instructions (e.g., code bytes) of the program under test can be included in the program recording. For example, code (e.g., binaries) from linkable libraries (e.g., dynamic link libraries) can be included. Information useful for debugging (e.g., symbol tables) can also be included if desired.

If desired, the compressed program recording can be sent (e.g., piped) to another machine during recording, allowing near real-time analysis as the information is gathered.

Additional information can be stored to facilitate portability, such as machine configuration information, architecture, endianness (e.g., byte order) of the machine, and the like.

EXAMPLE 36

Exemplary User Interface

A user interface can be presented to a developer by which the machine state as determined via the compressed program recording is indicated. Controls (e.g., single stepping, stepping backwards, jumping ahead n instructions, breakpointing, and the like) can be presented by which the developer can control the display of the machine state.

To the developer, it appears that the program is being executed in debug mode, but a compressed program recording can be used to avoid the full processing and storage associated with full debug mode.

EXAMPLE 37

Exemplary File Format

Any number of formats can be used to store a compressed program recording. For example, the information can be saved in a file (e.g., on disk). In order to reduce contention between different threads of the program being monitored, data can be recorded for each thread independently in different streams within the file. For each stream, the data for simulating program execution during playback can be recorded.

The file format can include sequencing packets, read packets, executable instructions, and the like. For example, the sequencing packets can store the sequence information described herein. A global integer or timer can be used for the sequence. Sequencing events can be made uniquely identifiable so that ordering can be achieved.

On a single processor system, perfect ordering can be achieved by tracking context-swaps between threads. The sequencing events can also be used to track key frames (e.g., when a thread transfers control from kernel mode and user mode).

Read packets can record read operations from memory. Unpredictable reads can be stored.

The executable instructions can include the bytes of the instructions executed in the program. During replay, a simulator can fetch such instructions for simulated execution.

EXAMPLE 38

Exemplary Memory

In any of the examples herein, the memory can be virtual memory. For example, memory accesses by a monitored program can be to virtual memory. Playback of a compressed program recording can then be used to determine the value of an address in such virtual memory (e.g., when a request for a value of an address in virtual memory is received).

EXAMPLE 39

Exemplary Computing Environment

Figure 33:
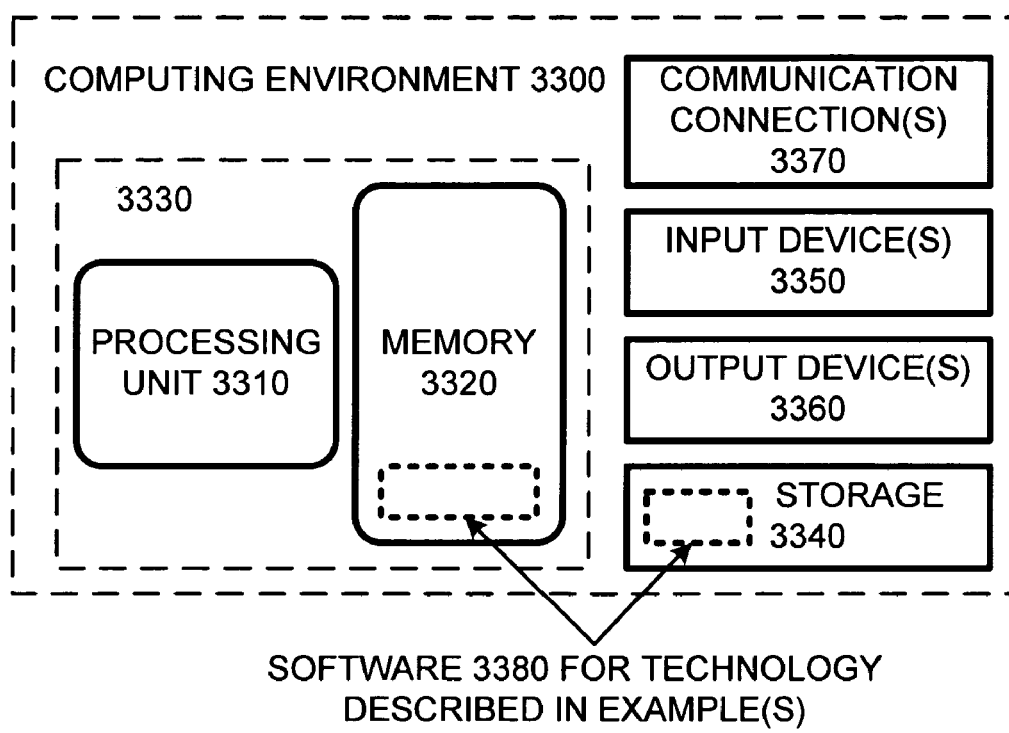
FIG. 33 is a block diagram of an exemplary suitable computing environment for implementing described implementations.

FIG. 33 illustrates a generalized example of a suitable computing environment 3300 in which the described techniques can be implemented. The computing environment 3300 is not intended to suggest any limitation as to scope of use or functionality, as the technologies may be implemented in diverse general-purpose or special-purpose computing environments.

With reference to FIG. 33, the computing environment 3300 includes at least one processing unit 3310 and memory 3320. In FIG. 33, this most basic configuration 3330 is included within a dashed line. The processing unit 3310 executes computer-executable instructions and may be a real or a virtual processor. In a multi-processing system, multiple processing units execute computer-executable instructions to increase processing power. The memory 3320 may be volatile memory (e.g., registers, cache, RAM), non-volatile memory (e.g., ROM, EEPROM, flash memory, etc.), or some combination of the two. The memory 3320 can store software 3380 implementing any of the technologies described herein.

A computing environment may have additional features. For example, the computing environment 3300 includes storage 3340, one or more input devices 3350, one or more output devices 3360, and one or more communication connections 3370. An interconnection mechanism (not shown) such as a bus, controller, or network interconnects the components of the computing environment 3300. Typically, operating system software (not shown) provides an operating environment for other software executing in the computing environment 3300, and coordinates activities of the components of the computing environment 3300.

The storage 3340 may be removable or non-removable, and includes magnetic disks, magnetic tapes or cassettes, CD-ROMs, CD-RWs, DVDs, or any other computer-readable media which can be used to store information and which can be accessed within the computing environment 3300. The storage 3340 can store software 3380 containing instructions for any of the technologies described herein.

The input device(s) 3350 may be a touch input device such as a keyboard, mouse, pen, or trackball, a voice input device, a scanning device, or another device that provides input to the computing environment 3300. For audio, the input device(s) 3350 may be a sound card or similar device that accepts audio input in analog or digital form, or a CD-ROM reader that provides audio samples to the computing environment. The output device(s) 3360 may be a display, printer, speaker, CD-writer, or another device that provides output from the computing environment 3300.

The communication connection(s) 3370 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Executable Media

Any of the methods described herein can be implemented by computer-executable instructions in one or more computer-readable media (e.g., computer-readable storage media).

Alternatives

The technologies from any example can be combined with the technologies described in any one or more of the other examples. In view of the many possible embodiments to

We claim:

1. A method comprising:
   monitoring execution of a software program under test, wherein the monitoring comprises monitoring state changes performed by the software program under test;
   recording the execution of the software program under test, wherein the recording comprises compressing the state changes;
   storing the recorded execution of the software program under test for later playback;
   tracking a memory address operation involving a value;
   discarding from storing in the recorded execution the value for the memory address when the value is predictable via simulated playback.

2. The method of claim 1 wherein predictability is determined by a predictor in the form of a virtual machine executing executable instructions of the software program under test.

3. The method of claim 1 wherein predictability is tracked via a cache storing a predictable value for the memory address and a hit count indicating how many successive times the cache will correctly predict values in succession.

4. The method of claim 3 further comprising:
   flushing the cache at a point in time during the execution; and
   writing a key frame indicating processor contents at the point in time during the execution.

5. The method of claim 3 further comprising:
   writing a snapshot indicating values for a plurality of memory locations during a point in time during the execution.

6. The method of claim 1 wherein the compressing comprises: discarding a write to a memory address.

7. A tangible computer-readable media comprising: a compressed recording of a software program under test, wherein the compressed recording comprises a representation of executable instructions in the software program under test and one or more state changes monitored during an execution of the software program under test; and
   a playback tool operable to play back the compressed recording, wherein the playback tool comprises a virtual processor operable to execute the executable instructions and a cache operable to store at least one value of a memory address as a single stored value that can be used plural times during playback to indicate successive identical values for memory read operations for the memory address according to the compressed recording.

8. The computer-readable media of claim 7 wherein the playback tool is further operable to locate a snapshot of memory within the compressed recording, and indicate value of a memory address as stored in the snapshot without having to employ the virtual processor to simulate execution.

9. The computer-readable media of claim 7 wherein the playback tool is further operable to locate a key frame within the compressed recording, load virtual processor state from the key frame, and playback execution from the key frame.

10. The computer-readable media of claim 9 wherein the playback tool is further operable to locate the key frame via a summarization index identifying the key frame and indicating a range of memory addresses for the key frame.

11. The computer-readable media of claim 7 wherein the playback tool is further operable to playback execution for multiple processors.

12. The computer-readable media of claim 11 wherein the playback tool is further operable to read atomically-incremented sequence numbers within the compressed recording to determine proper order of execution of subsequences of instructions within the compressed recording.

* * * * *